United States Patent
Alkhatib et al.

(10) Patent No.: US 7,139,828 B2
(45) Date of Patent: Nov. 21, 2006

(54) ACCESSING AN ENTITY INSIDE A PRIVATE NETWORK

(75) Inventors: Hasan S. Alkhatib, Saratoga, CA (US);
Yun Fei Zhang, Lexington, MA (US);
Fouad A. Tobagi, Los Altos, CA (US);
Farid F. Elwailly, San Jose, CA (US)

(73) Assignee: IP Dynamics, Inc., San Jose, CA (US)

( * ) Notice: Subject to any disclaimer, the term of this patent is extended or adjusted under 35 U.S.C. 154(b) by 0 days.

(21) Appl. No.: 10/233,289

(22) Filed: Aug. 30, 2002

(65) Prior Publication Data

US 2004/0044778 A1    Mar. 4, 2004

(51) Int. Cl.
  *G06F 15/16*    (2006.01)
  *G06F 15/173*   (2006.01)
(52) U.S. Cl. .................. 709/230; 709/245; 709/238
(58) Field of Classification Search .............. 709/227, 709/228, 230, 238, 250, 216–219, 223–224, 709/245

See application file for complete search history.

(56) References Cited

U.S. PATENT DOCUMENTS

| | | |
|---|---|---|
| 5,361,256 A | 11/1994 | Doeringer et al. |
| 5,563,878 A | 10/1996 | Blakeley |
| 5,623,605 A | 4/1997 | Keshav et al. |
| 5,701,427 A | 12/1997 | Lathrop |
| 5,717,687 A | 2/1998 | Minot et al. |
| 5,734,651 A | 3/1998 | Blakeley |
| 5,751,961 A | 5/1998 | Smyk |
| 5,764,906 A | 6/1998 | Edelstein et al. |
| 5,777,989 A | 7/1998 | McGarvey |
| 5,781,550 A | 7/1998 | Templin et al. |
| 5,790,548 A | 8/1998 | Sistainizadeh et al. |
| 5,793,763 A | 8/1998 | Mayes et al. |
| 5,805,818 A | 9/1998 | Perlman et al. |
| 5,805,820 A | 9/1998 | Bellovin et al. |
| 5,815,664 A | 9/1998 | Asano |
| 5,826,014 A | 10/1998 | Coley et al. |
| 5,856,974 A | 1/1999 | Gervais et al. |
| 5,867,667 A | 2/1999 | Butman et al. |
| 5,884,038 A | 3/1999 | Kapoor |
| 5,884,246 A | 3/1999 | Boucher et al. |
| 5,889,953 A | 3/1999 | Thebaut et al. |
| 5,897,662 A | 4/1999 | Corrigan et al. |
| 5,898,830 A | 4/1999 | Wesinger, Jr. et al. |
| 5,913,210 A | 6/1999 | Call |

(Continued)

FOREIGN PATENT DOCUMENTS

EP    0 817 444 A2    1/1998

OTHER PUBLICATIONS

RFC1631 The IP Network Address Translator (NAT), May 1994.

(Continued)

*Primary Examiner*—Ario Etienne
*Assistant Examiner*—Hussein El-chanti
(74) *Attorney, Agent, or Firm*—Vierra Magen Marcus & DeNiro LLP

(57) ABSTRACT

A system is disclosed that allows an entity outside of a private network to initiate communication with an entity inside the private network. The entity inside of the private network maintains a persistent connection with an agent. In one embodiment, communications that are intended for the entity inside the private network are sent to the agent. The agent then forwards the communications to the entity inside the private via the persistent connection.

74 Claims, 12 Drawing Sheets

U.S. PATENT DOCUMENTS

| | | | |
|---|---|---|---|
| 5,937,162 A | 8/1999 | Funk et al. | |
| 5,937,163 A | 8/1999 | Lee et al. | |
| 6,003,084 A | 12/1999 | Green et al. | |
| 6,006,272 A | 12/1999 | Aravamudan | |
| 6,032,196 A | 2/2000 | Monier | |
| 6,047,325 A | 4/2000 | Jain et al. | |
| 6,055,236 A | 4/2000 | Nessett et al. | |
| 6,055,575 A | 4/2000 | Paulsen et al. | |
| 6,061,349 A * | 5/2000 | Coile et al. | 370/389 |
| 6,061,738 A | 5/2000 | Osaku et al. | |
| 6,101,543 A | 8/2000 | Alden et al. | |
| 6,119,171 A | 9/2000 | Alkhatib | |
| 6,122,276 A | 9/2000 | Boe et al. | |
| 6,137,791 A | 10/2000 | Frid et al. | |
| 6,154,839 A * | 11/2000 | Arrow et al. | 713/154 |
| 6,219,715 B1 | 4/2001 | Ohno et al. | |
| 6,243,749 B1 | 6/2001 | Sitaraman et al. | |
| 6,249,801 B1 * | 6/2001 | Zisapel et al. | 718/105 |
| 6,266,707 B1 | 7/2001 | Boden et al. | |
| 6,353,614 B1 | 3/2002 | Borella et al. | |
| 6,353,886 B1 * | 3/2002 | Howard et al. | 713/156 |
| 6,381,638 B1 | 4/2002 | Mahler et al. | |
| 6,430,622 B1 * | 8/2002 | Aiken et al. | 709/245 |
| 6,430,623 B1 | 8/2002 | Alkhatib | |
| 6,452,925 B1 * | 9/2002 | Sistanizadeh et al. | 370/352 |
| 6,457,061 B1 * | 9/2002 | Bal et al. | 709/245 |
| 6,480,508 B1 | 11/2002 | Mwikalo et al. | |
| 6,557,037 B1 | 4/2003 | Provino | |
| 6,591,306 B1 | 7/2003 | Redlich | |
| 6,618,757 B1 | 9/2003 | Babbitt et al. | |
| 6,629,137 B1 | 9/2003 | Wynn | |
| 6,651,101 B1 * | 11/2003 | Gai et al. | 709/224 |
| 6,662,223 B1 * | 12/2003 | Zhang et al. | 709/224 |
| 6,697,377 B1 * | 2/2004 | Ju et al. | 370/466 |
| 6,742,045 B1 * | 5/2004 | Albert et al. | 709/238 |
| 6,747,979 B1 | 6/2004 | Banks et al. | |
| 6,754,706 B1 * | 6/2004 | Swildens et al. | 709/225 |
| 6,779,035 B1 * | 8/2004 | Gbadegesin | 709/228 |
| 6,993,012 B1 * | 1/2006 | Liu et al. | 370/352 |

OTHER PUBLICATIONS

Venters, Demystifying Protocols: A comparison of Protocols Suitable for IP Telephony, Sonus Networks, pp. 1-11, 2000.

Tsuchiya, et al., Extending the IP Internet Through Address Reuse, ACM SIGCOMM Computer Communication Review, pp. 16-33, Jan. 1993.

Francis, et al., IPNL: A NAT-Extended Internet Architecture, SIGCOMM'01, Aug. 27-31, 2001, pp. 69-79.

Yalagandula, et al., Transparent Mobility with Minimal Infrastructure, University of Texas at Austin, pp. 1-14, Jul. 2001.

Teraoka, et al., VIP: A Protocol Providing Host Mobility, Communications of the ACM, Aug. 1994/vol. 37, No. 8, pp. 67-75, 113.

Egevang, et al., The IP Network Address Translator (NAT), Network Working Group, RFC 1631, May 1994, pp. 1-10.

Chatel, Classical Versus Transparent IP Proxies, Network Working Group, RFC 1919, Mar. 1996, pp. 1-35.

Finseth, An Access Control Protocol, Sometimes Called TACACS, Network Working Group, Jul. 1993, pp. 1-18.

Computer Netowrks, Third Edition, by Andrew S. Tanenbaum, 1996, pp. 643-670, 685-691.

Perkins, Mobile IP, IEEE Communications Magazine, May 1997, pp. 84-99.

Rekhter, "Cisco Systems' Tag Switching Architecture Overview," Network Working Group, Feb. 1997.

Kent, "Security Architecture for the Internet Protocol," Network Working Group, Nov. 1998.

Computer Dictionary: Microsoft Press; 3rd Edition; 1997; p. 264.

Excerpts from the Help section of Microsoft Outlook pertaining to rules and forwarding email. Microsoft Corporation.

RFC 1631, The IP Network Address Translator (NAT), K. Egevang and P. Francis, May 1994.

* cited by examiner

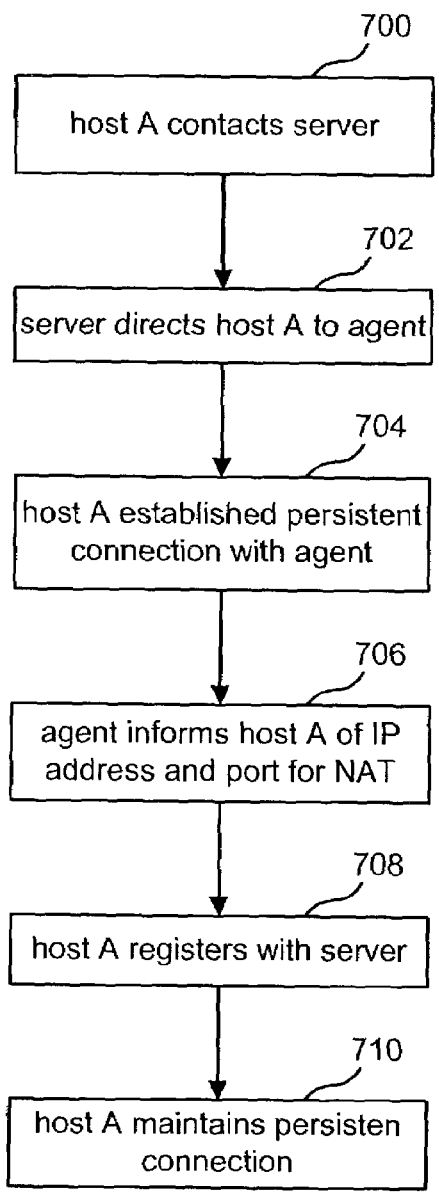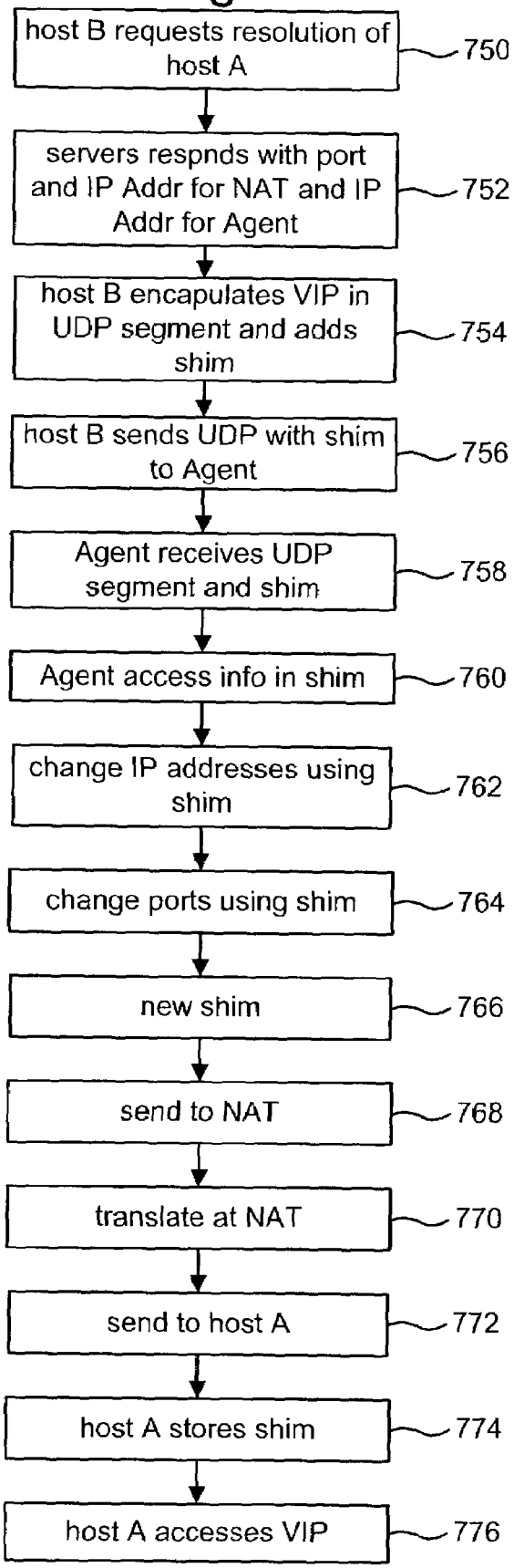

ACCESSING AN ENTITY INSIDE A PRIVATE NETWORK

CROSS REFERENCE TO RELATED APPLICATIONS

This application is related to the following Patents/Applications:

INLET GATEWAY, Hasan S. Alkhatib and Bruce C. Wootton, U.S. application Ser. No. 09/167,709, filed on Oct. 6, 1998, issued as U.S. Pat. No. 6,421,732 on Jul. 16, 2002;

PSEUDO ADDRESSING, Wootton, et al., Ser. No. 09/637,803, filed on Aug. 11, 2000; and COMMUNICATING WITH AN ENTITY INSIDE A PRIVATE NETWORK USING AN EXISTING CONNECTION TO INITIATE COMMUNICATION, Hasan S. Alkhatib, Fouad A. Tobagi, Farid F. Elwailly and Bruce C. Wootton. filed on the same day as the present application, Aug. 30, 2002, now Ser. No. 10/233,288.

Each of the related Patents/Applications are incorporated herein by reference.

BACKGROUND OF THE INVENTION

1. Field of the Invention

The present invention is directed to system for accessing an entity inside a private network.

2. Description of the Related Art

Most machines on the Internet use the TCP/IP (Transmission Control Protocol/Internet Protocol) reference model to send data to other machines on the Internet. The TCP/IP reference model includes four layers: the physical and data link layer, the network layer, the transport layer, and the application layer. The physical layer portion of the physical and data link layer is concerned with transmitting raw bits over a communication channel. The data link portion of the Physical and Data Link layer takes the raw transmission facility and transforms it into a line that appears to be relatively free of transmission errors. It accomplishes this task by having the sender break the input data up into frames, transmit the frames and process the acknowledgment frames sent back by the receiver.

The network layer permits a host to inject packets into a network and have them travel independently to the destination. On the Internet, the protocol used for the network layer is the Internet Protocol (IP).

The transport layer is designed to allow peer entities on the source and destination to carry on a "conversation." On the Internet, two protocols are used. The first one, the Transmission Control Protocol (TCP), is a reliable connection-oriented protocol that allows a byte stream originating on one machine to be delivered without error to another machine on the Internet. It fragments the incoming byte stream into discrete segments and passes each one to the network layer. At the destination, the receiving TCP process reassembles the received segments into the output stream. TCP also handles flow control to make sure a fast sender cannot swamp a slow receiver with more segments than it can handle. The second protocol used in the transport layer on the Internet is the User Datagram Protocol (UDP), which does not provide the TCP sequencing or flow control. UDP is typically used for one-shot, client server type requests-reply queries for applications in which prompt delivery is more important than accurate delivery.

The transport layer is typically thought of as being above the network layer to indicate that the network layer provides a service to the transport layer. Similarly, the transport layer is typically thought of as being below the application layer to indicate that the transport layer provides a service to the application layer.

The application layer contains the high level protocols, for example, Telnet, File Transfer Protocol (FTP), Electronic Mail—Simple Mail Transfer Protocol (SMTP), and Hypertext Transfer Protocol (HTTP).

To transmit data from a source to a destination, the Internet Protocol uses an IP address. An IP address is four bytes long, and consists of a network number and a host number. When written out, IP addresses are specified as four numbers separated by dots (e.g. 198.68.70.1). Users and software applications do not always refer to hosts or other resources by their numerical IP address. Instead of using numbers, they use ASCII strings called domain names. The Internet uses a Domain Name System (DNS) to convert a domain name to an IP address.

The Internet Protocol has been in use for over two decades. It has worked extremely well, as demonstrated by the exponential growth of the Internet. Unfortunately, the Internet is rapidly becoming a victim of its own popularity: it is running out of addresses.

One proposed solution to the depleting address problem is Network Address Translation (NAT). This concept includes predefining a number of network addresses to be private addresses. The remainder of the addresses are considered global or public addresses. Public addresses are unique addresses that should only be used by one entity having access to the Internet. That is, no two entities on the Internet should have the same public address. Private addresses are not unique and are typically used for entities not having direct access to the Internet. Private addresses can be used by more than one organization or network. NAT assumes that all of the machines on a network will not need to access the Internet at all times. Therefore, there is no need for each machine to have a public address. A local network can function with a small number of one or more public addresses assigned to one or more gateway computers. The remainder of the machines on the network will be assigned private addresses. Since entities on the network have private addresses, the network is considered to be a private network.

When a particular machine having a private address on the private network attempts to initiate a communication to a machine outside of the private network (e.g. via the Internet), the gateway machine will intercept the communication, change the source machine's private address to a public address and set up a table for translation between public addresses and private addresses. The table can contain the destination address, port numbers, sequencing information, byte counts and internal flags for each connection associated with a host address. Inbound packets are compared against entries in the table and permitted through the gateway only if an appropriate connection exists to validate their passage. One problem with the NAT approach is that it only works for communication initiated by a host within the private network to a host on the Internet that has a public IP address. The NAT approach specifically will not work if the communication is initiated by a host outside of the private network and is directed to a host with a private address in the private network.

Another problem is that mobile computing devices can be moved to new and different networks, including private networks. These mobile computing devices may need to be reachable so that a host outside of the private network can initiate communication with the mobile computing device. However, in this case the problem is two-fold. First, there is no means for allowing the host outside of the private network to initiate communication with the mobile computing device. Second, the host outside the private network does not know the address for the mobile computing device or the network that the mobile computing device is currently connected to.

SUMMARY OF THE INVENTION

The present invention, roughly described, pertains to a system for accessing an entity inside a private network. The system disclosed allows an entity outside of a private network to initiate communication with an entity inside the private network. A first entity inside of the private network establishes a persistent connection with a second entity. A third entity outside of the private network can establish communication with the first entity using an identification associated with the persistent connection. Subsequent to the establishment of communication, the first and third entities can communicate.

One embodiment of the present invention includes maintaining a persistent connection between the first entity in the private network and the second entity. The third entity sends a communication, intended for the first entity, to the second entity. The second entity receives the communication and forwards the communication to the first entity using the persistent connection. In one implementation, the persistent connection is a UDP connection. Data sent from the third entity to the second entity is transmitted from the second entity to the first entity via UDP segments. The persistent connection is maintained by repeatedly sending UDP segments prior to a connection time out. In some embodiments, the second entity store state information about the persistent connection and routing, while in other embodiments, the first and third entities store the state information. In various alternatives, the persistent connection can be established using a protocol other than UDP.

The first, second and third entities can be any device that can communicate on a network, including mobile and non-mobile computing devices such as desktop computers, laptop computers, telephones, handheld computing devices, network appliances, servers, routers, gateways, etc. The entities can also be a process, thread, etc.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 14 is a flow chart describing another embodiment for making a host available for communication.

FIG. 15 is a flow chart describing another embodiment of a process for sending a communication to an entity in a private network.

DETAILED DESCRIPTION

Figure 1:
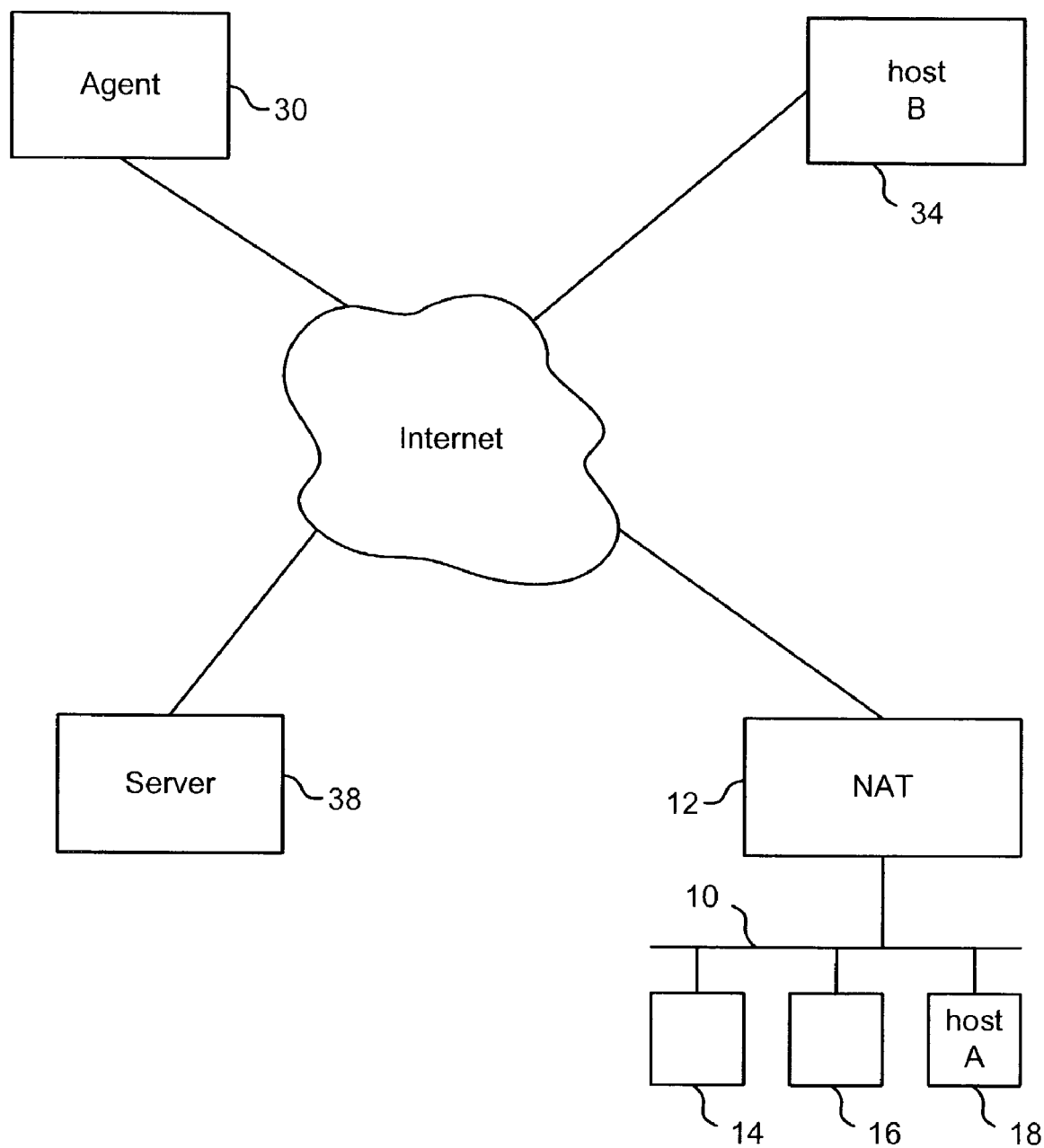
FIG. 1 depicts a block diagram of one embodiment of the components of the present invention.

FIG. 1 is a block diagram of one embodiment of the components of the present invention. FIG. 1 shows a private network 10. The components connected to private network 10 include a NAT device 12, and entities 14, 16, and 18. The entities can be any device that can communicate on a network, including mobile and non-mobile computing devices such as desktop computers, laptop computers, telephones, handheld computing devices, network appliances, servers, routers, gateways, etc. In one embodiment, each (or some) of the entities have a communication device (e.g. network interface), a storage device, I/O devices and one or more processors programmed to implement the present invention. All or part of the invention can include software stored on one or more storage devices to program one or more processors. The entities can also be a process, thread, etc. In one embodiment, NAT device 12 is a computing device that is running Network Address Translation (NAT). NAT device 12 is one example of a stateful edge switch that allows communication to be initiated in one direction. Other stateful edge switches can also be used with the present invention. FIG. 1 shows NAT device 12 connected to the Internet so that the entities on private network 10 can communicate with other entities on the Internet using NAT. Note that it is not necessary for NAT device 12 to be a physical gateway on the edge of the network between private network 10 and Internet. It is also possible that NAT device 12 can be inside the private network.

FIG. 1 shows entity 18 labeled as host A. Thus, host A is an entity in a private network. In one embodiment, host A is a mobile computing device that is connected to private network 10. When host A connects to private network 10, it is assigned a private address. When host A wants to communicate outside of private network 10, NAT device 12 allows host A to communicate using a public address assigned to NAT device 12. In some embodiments, host A is a computing device that is not mobile. In other embodiments, there may be multiple subnets for NAT 12 and host A can be on any of those subnets.

FIG. 1 also shows Agent 30, host B 34, and server 38 connected to Internet. According to one embodiment of the present invention, host A registers with Agent 30 and sets up a persistent communication with Agent 30 so that host A can be accessible by entities outside of private network 10.

In one example, host B is a computer with a public IP address. Host B knows the domain name for host A; however, host B does not know an address for host A. According to the present invention, host B requests server 38 to resolve a domain name for host A. Server 38 responds to host B's request by returning the IP address for Agent 30. Host B creates a communication for host A and sends that communication to Agent 30. Agent 30 then forwards the communication to host A via the persistent connection between Agent 30 and host A. Host A can reply back to host B via the persistent connection or host A can send its reply outside of the persistent connection. Sending the reply without using the persistent connection alleviates the load on the second entity.

Figure 2:
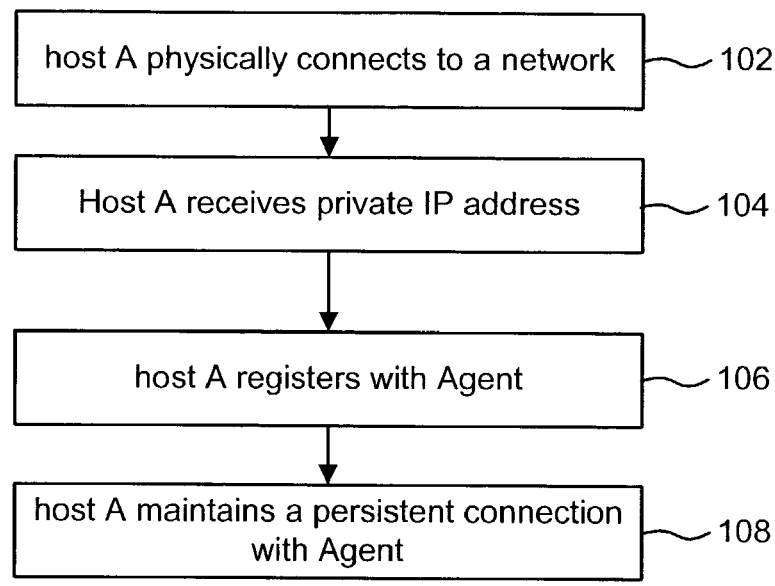
FIG. 2 is a flow chart describing one embodiment of a process for implementing a portion of the present invention.

FIG. 2 describes one embodiment of the steps taken to make host A accessible to entities outside of private network 10. In step 102, host A physically connects to private network 10. In step 104, host A receives a private address for communication on private network 10. In step 106, host A registers with Agent 30. In step 108, a persistent connection is maintained between host A and Agent 30. One example of a suitable persistent connection is a UDP (User Data Protocol) connection as described below. Other types of persistent connections can be used such as TCP connections, other protocols, etc. In one embodiment, host A maintains the persistent connection. In other embodiments, the persistent connection is maintained by Agent 30, a combination of Agent 30 and host A, or another entity. A UDP connection will normally have a timeout interval. In one embodiment, maintaining the connection includes repeatedly sending UDP segments so that a new UDP segment is sent prior to the timeout interval completing.

Figure 3:
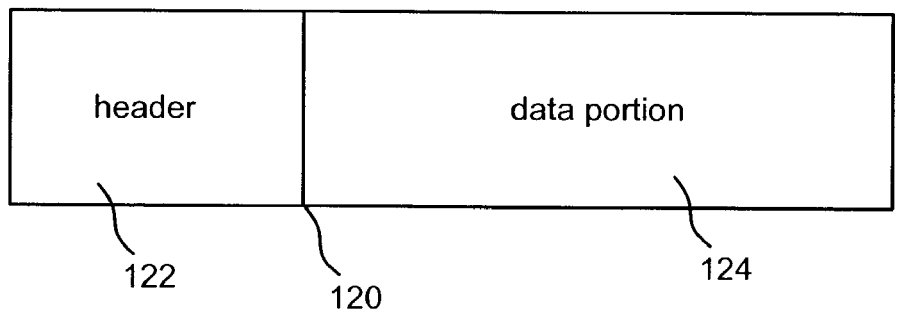
FIG. 3 depicts a UDP segment.

UDP is a protocol that operates at the transport layer of the TCP/IP stack. UDP is described in RFC 768, which is incorporated herein by reference. FIG. 3 depicts UDP segment 120, which includes a header 122 and a data portion 124.

Figure 4:
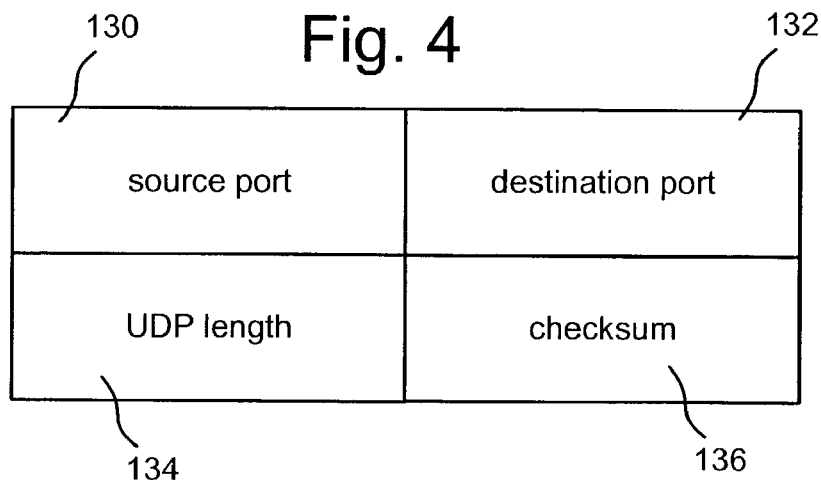
FIG. 4 depicts a header for a UDP segment.

FIG. 4 depicts the details of header 122. Header 122 is 8 bytes and includes source port 130, destination port 132, UDP length 134, and checksum 136. Source port 130 and destination port 132 identify the end points within the source and destination entities. UDP length 134 indicates the length of header 122 and data portion 124. UDP checksum 136 is provided for reliability purposes.

Figure 5:
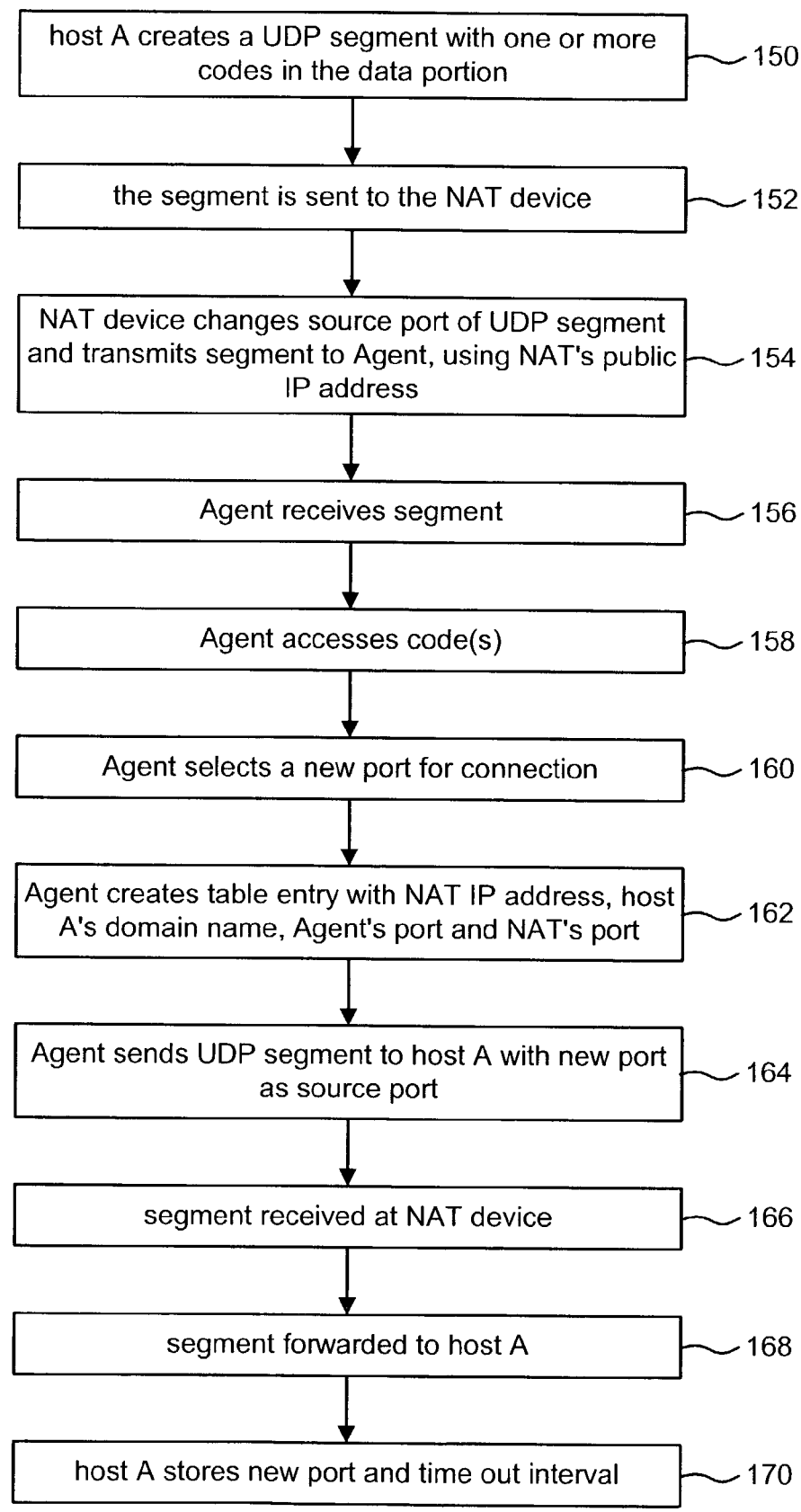
FIG. 5 is a flow chart describing one embodiment of a process for registering with a second entity.

FIG. 5 is a flow chart describing the process of host A registering with Agent 30 (step 106 of FIG. 2). In step 150, host A creates a UDP segment with one or more codes in the data portion. In one embodiment of the present invention, a protocol can be designed which includes a set of codes to be stored in the data portion of UDP segments, These codes can indicate that a new connection is requested, an existing connection should be terminated, move the connection to port #, the domain name of the sender is <domain name>, the time out interval for the UDP connection is X, and other messages. In one embodiment, the UDP segment created in step 150 includes codes that indicate that a new connection is requested and identifies the domain name for host A. In one embodiment, the codes are sent in the data portion of the UDP segment.

In step 152, the UDP segment created in step 150 is sent to the NAT device 12. For example, the UDP segment is created listing a port on host A as its source port and a well known port for UDP on Agent 30 as the destination port. The UDP segment is placed within one or more IP packets. The source address of the IP packets is the private address of host A. The destination address of the IP packets is the public IP address of Agent 30. The IP packets are first sent to NAT device 12. In step 154, NAT device 12 receives the UDP segment and changes the source port to a port on NAT device 12, in accordance with standard NAT operation. The changed UDP segment is placed within one or more IP packets. The source address of the IP packets is a public address associated with NAT device 12. The destination address of the IP packets is the public IP address of Agent 30. In step 156, the UDP segment is received by Agent 30.

In step 158, Agent 30 accesses the codes in the data portion of the UDP segment and determines based on the codes that host A is requesting that a connection be set up between host A and Agent 30. In step 160, Agent 30 selects a port on Agent 30 for servicing the new connection with host A.

Agent 30 maintains a look up table for all of its connections with entities inside private networks. Data structures other than a table can also be used. Each connection has an entry in the table. Each entry stores the domain name of the entity in the private network, the public IP address used for the entity (e.g. the address provided by the NAT device), the port for the NAT device (or other stateful edge device or other device), and the port used for the connection on Agent 30. In one embodiment, other data can be stored in a table entry, such as the time out interval for the connection. In step 162, Agent 30 creates an entry in the table for the new connection.

In step 164, Agent 30 creates a UDP segment and sends it to host A. The UDP segment may include codes in the data portion indicating that the connection has been created and the time out interval for the connection. The segment sent in step 164 is received by NAT device 12 in step 166, which forwards the segment to host A in step 168. In step 170, host A stores the port number for Agent 30 (selected in step 160) and the time out interval.

Figure 6:
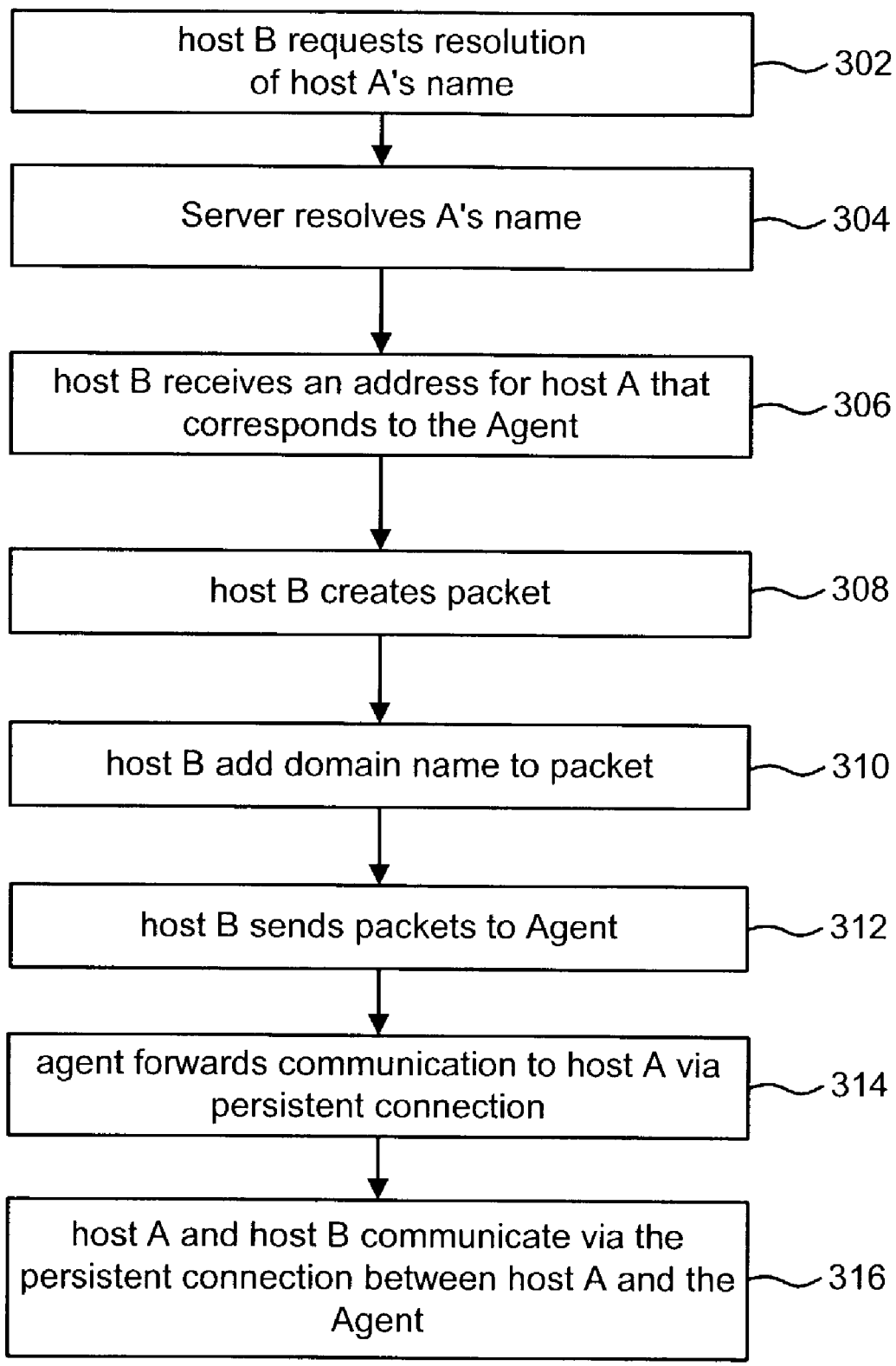
FIG. 6 is a flow chart describing one embodiment of a process for sending a communication to an entity in a private network.

FIG. 6 is a flowchart which describes a process that is performed when host B initiates communication with host A. Host B knows the domain name for host A, but does not know an address for host A and does not know what network host A is connected to. In step 302, host B requests resolution of host A's domain name. In one embodiment, step 302 includes a standard request for domain name resolution. The request to resolve host A's domain name is received by server 38. In one embodiment, server 38 is the authoritative domain name server for host A. In step 304, server 38 responds to the request for the domain name resolution by finding the appropriate DNS record that corresponds to the domain name provided. In one embodiment, the DNS record that corresponds to the domain name for host A identifies the IP address of Agent 30 as the IP address associated with the domain name for host A. In step 306, server 38 sends the IP address for Agent 30 to host B. In the discussion above, host B is requesting resolution of the domain name. In other embodiments, other types of names can be resolved. That is, the present invention works in any other spaces. For example, the present invention can be used with LDAP names.

In one embodiment, server 38 responds with a standard DNS record. In other embodiments, server 38 responds with a different set of information. For example, server 38 can respond with an identification code for communicating with host A, in addition to the IP address for Agent 30. Server 38 can also provide the private IP address or port for host A, as well as the IP address for NAT device 12.

In step 308, host B creates an IP packet to send to Agent 30. In one implementation, step 308 includes inserting data from a transport layer protocol process into the IP packet. In another implementation, step 308 includes encapsulating a first IP packet (or other data quantity) into a second IP packet. For example, if host B was using IPsec (e.g. for implementing a Virtual Private Network or other purpose), then step 308 could include encapsulating the IPsec packet into another IP packet.

In one embodiment in which host B is using IPsec (end-to-end) to communicate with host A, the IPsec packet will utilize pseudo addresses to identify host A and host B. For example, host A can use a unique (or unique locally in a VPN) four byte index to identify host B. Similarly, host B can use a unique (or unique locally in a VPN) four byte index to identify host A. Thus, the source address of the IPsec packet from host B to host A will be the pseudo address which host A uses to represent host B. The destination address will be the pseudo address that host B uses to represent host A.

In step 310, host B adds the domain name for host A to the IP packet created in step 308. The domain name can be added in the options field of the header for IP packet, the data portion of the IP packet, a new field added to the header of the IP packet, to a different field in the header of the IP packet, to another packet encapsulating or encapsulated within the IP packet created in step 308, in a transport layer segment within the IP packet or another location in the IP packet. The exact placement of the domain name is unimportant as long as host B and second entity 30 know where the domain name is.

Some embodiments use identifiers other than a domain name to distinguish host A from other hosts that have a private address. In those embodiments, the identifier being used is placed in the packet in step 310. Example of other identifiers include the private address, private address in combination with the public address for the NAT, a port number, a port number in combination with the public address for the NAT, a socket number, or another identifier that can be used to identify host A.

An additional alternative to using the domain name in the packets is assigning a specific address IPa to host A. The specific address IPa is routable to the second entity, uniquely identifying host A, and published in the server for the duration of Host A's registration with the server. In one alternative, address IPa may not have to be routable; rather, it can be used as the destination address in a datagram that gets encapsulated within another datagram destined to the second entity (destination address IPg). In yet another alternative, host B establishes a persistent connection with the second entity (similar to host A's persistent connection with the second entity) and uses a specific port number uniquely identifying host A. In this case, the second entity acts as a switch among persistent connection. Note that the persistent connections can be thought of as tunnels.

In step 312, the IP packet created in step 308 is sent to Agent 30. In step 314, Agent 30 forwards the IP packet to host A via the persistent connection established between host A and Agent 30. In step 316, host A and host B communicate, including sending IP packets between host A and host B using the persistent connection between host A and Agent 30.

Figure 7:
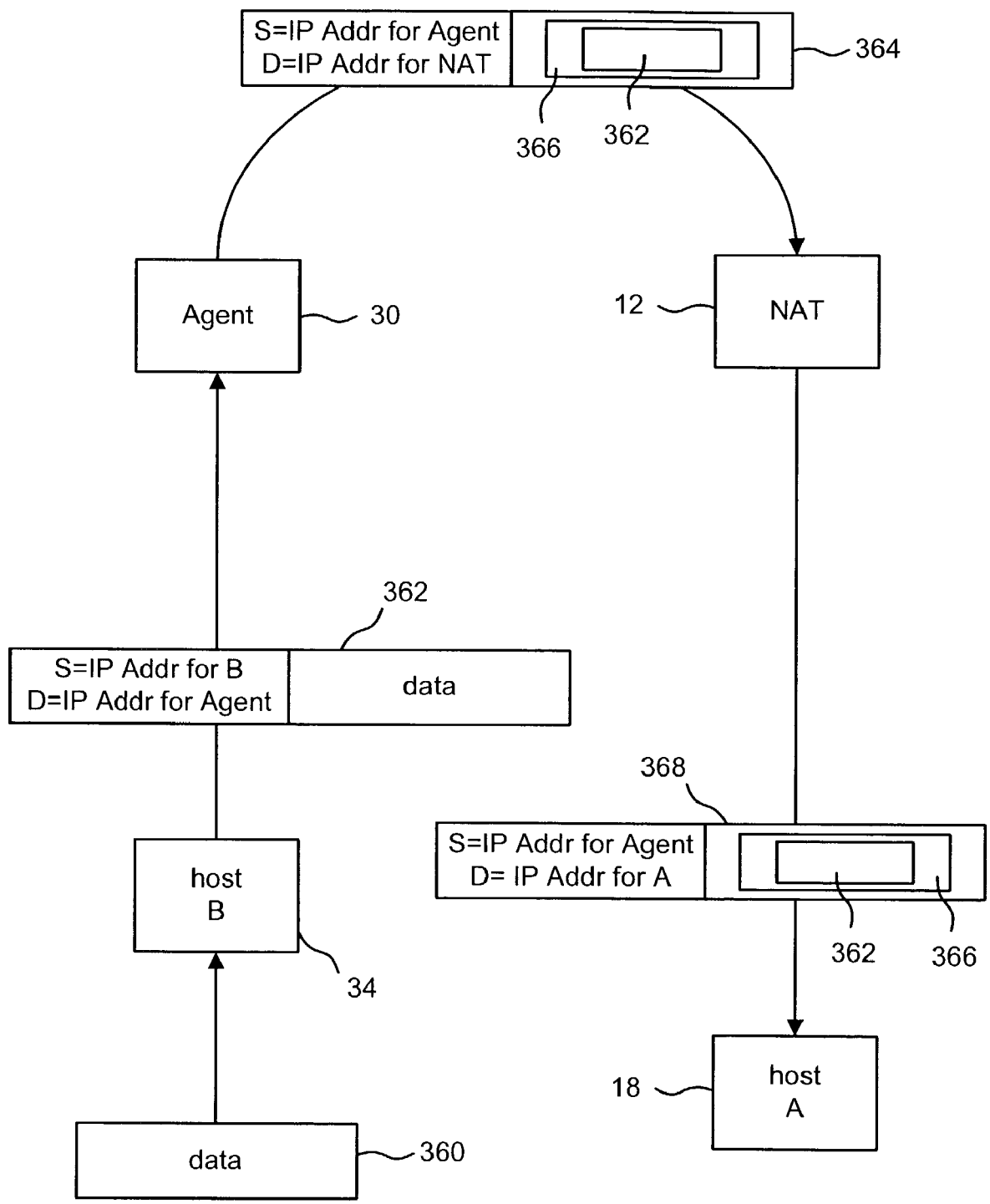
FIG. 7 is a block diagram that explains one embodiment of the process of sending data to an entity in a private network.
Figure 8:
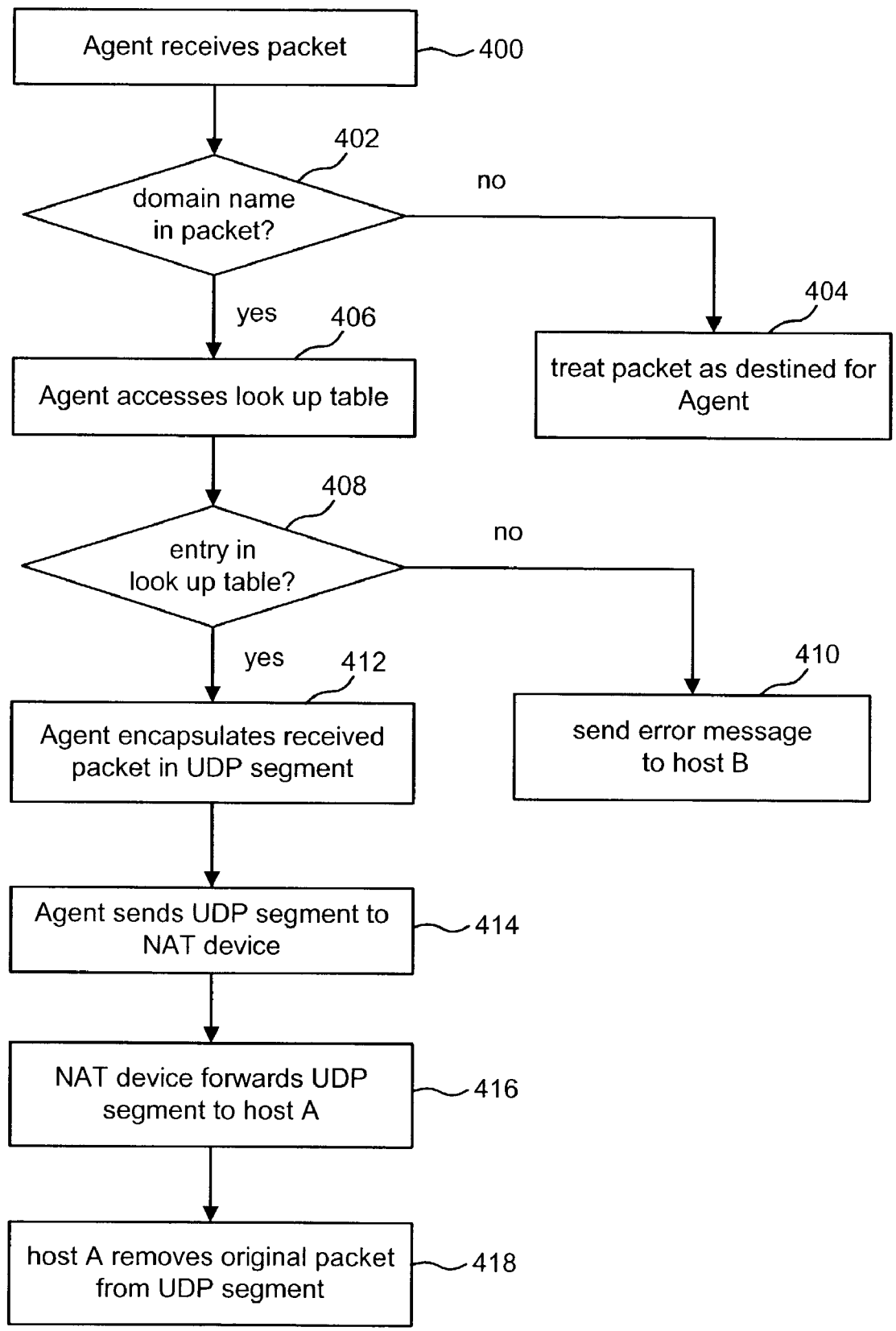
FIG. 8 is a flow chart describing one embodiment of a process for forwarding data from a second entity to an entity in a private network.

FIG. 7 illustrates the process of FIGS. 6 and 8. For example, FIG. 7 shows host B accessing data 360 to be inserted in the IP packet in step 308 of FIG. 6. The IP packet created in step 308 is depicted as IP packet 362 having a source IP address as the IP address for host B and a destination IP address as the IP address for Agent 30. Data 360 is placed in the data portion of the IP packet to 362. IP packet 362 is sent to Agent 30 in step 312 of FIG. 6. In step 314 of FIG. 6, Agent 30 creates IP packet 364 and forwards IP packet 364 toward host A.

FIG. 8 is a flowchart which describes the process performed by Agent 30, NAT device 12 and host A in step 314 of FIG. 6. The discussion of FIG. 8 makes reference to FIG. 7. In step 400, Agent 30 receives IP packet 362. In step 402, Agent 30 determines whether IP packet 362 includes a domain name. In embodiments that use an identifier other than a domain name, step 402 looks for that other identifier. If the domain name is not found, and Agent 30 treats the received IP packet as an IP packet destined for itself. If the domain name was found in IP packet 362, then Agent 30 uses the domain name to access the look up table stored on Agent 30. If the domain name does not correspond to any entries in the table (step 408), then an error message is sent to host B in step 410. If the domain name does correspond to an entry in the table, then that entry is read by Agent 30 and used to create UDP segment 366 and new IP packet 364. The source and destination ports for UDP segment 366 correspond to those stored in the lookup table. IP packet 362 received from host B is encapsulated inside the data portion of UDP segment 366 in step 412. All or a portion of UDP segment 366 is placed inside the data portion of IP packet 364. The source address for IP packet 364 is the IP address for Agent 30. The destination address for IP packet 364 is the IP address for NAT device 12, which was stored in the entry in the look up table. In step 414, UDP segment is sent to NAT device 12. In step 416, NAT device 12 forwards the UDP segment to host A. FIG. 7 shows NAT device 12 forwarding IP packet 368 to host A. IP packet 368 includes all or part of UDP segment 366. The source address for IP packet 368 is the IP address for Agent 30. The destination address for IP packet 368 is the private IP address for host A. In step 418, host A removes the original IP packet 362 from UDP segment 366. In the embodiment where host B encapsulated an IPsec packet within IP packet 362, host A removes the IPsec packet from IP packet 362.

Figure 9:
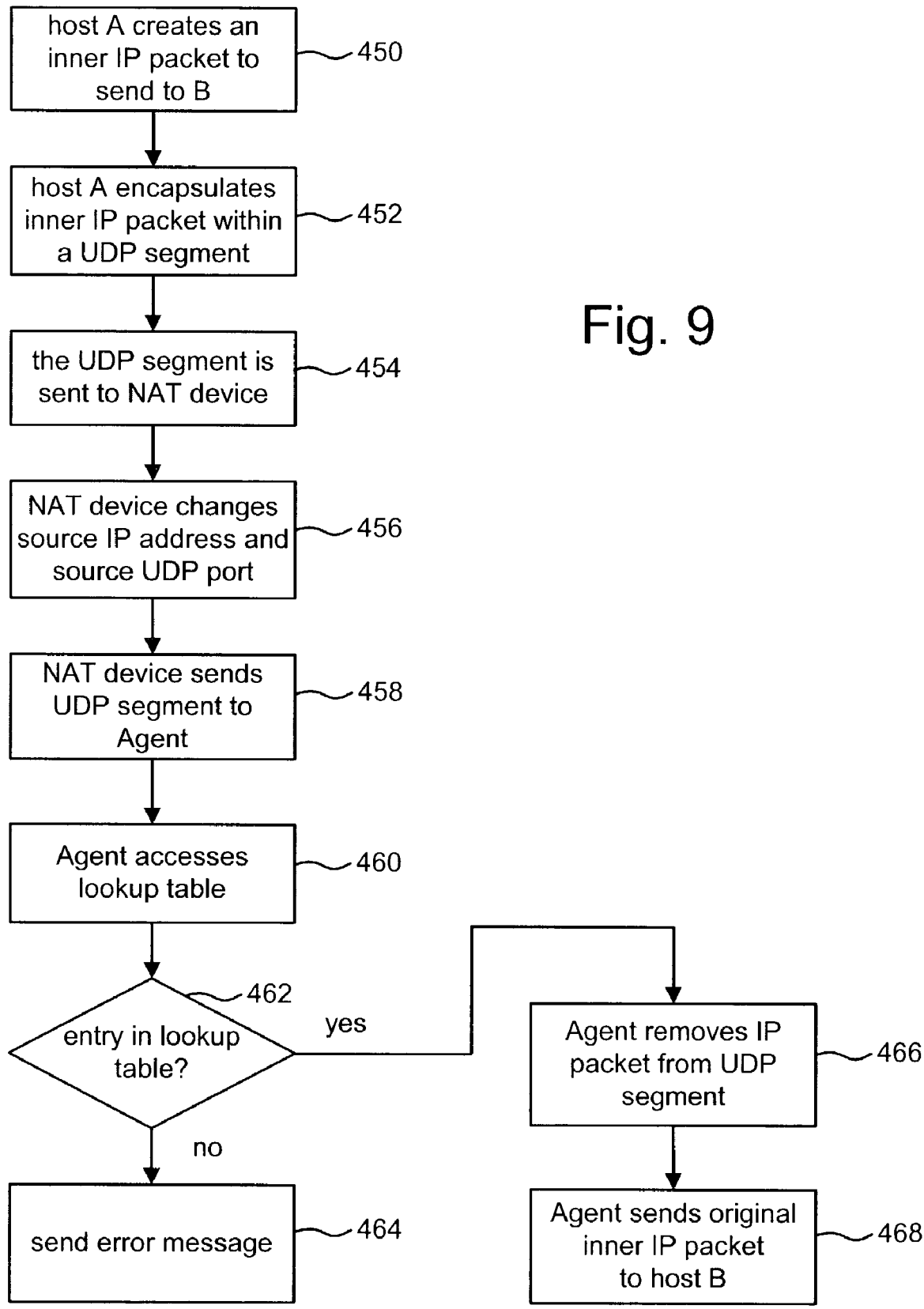
FIG. 9 is a flow chart describing one embodiment for sending data from an entity in a private network to another entity outside of the private network.
Figure 10:
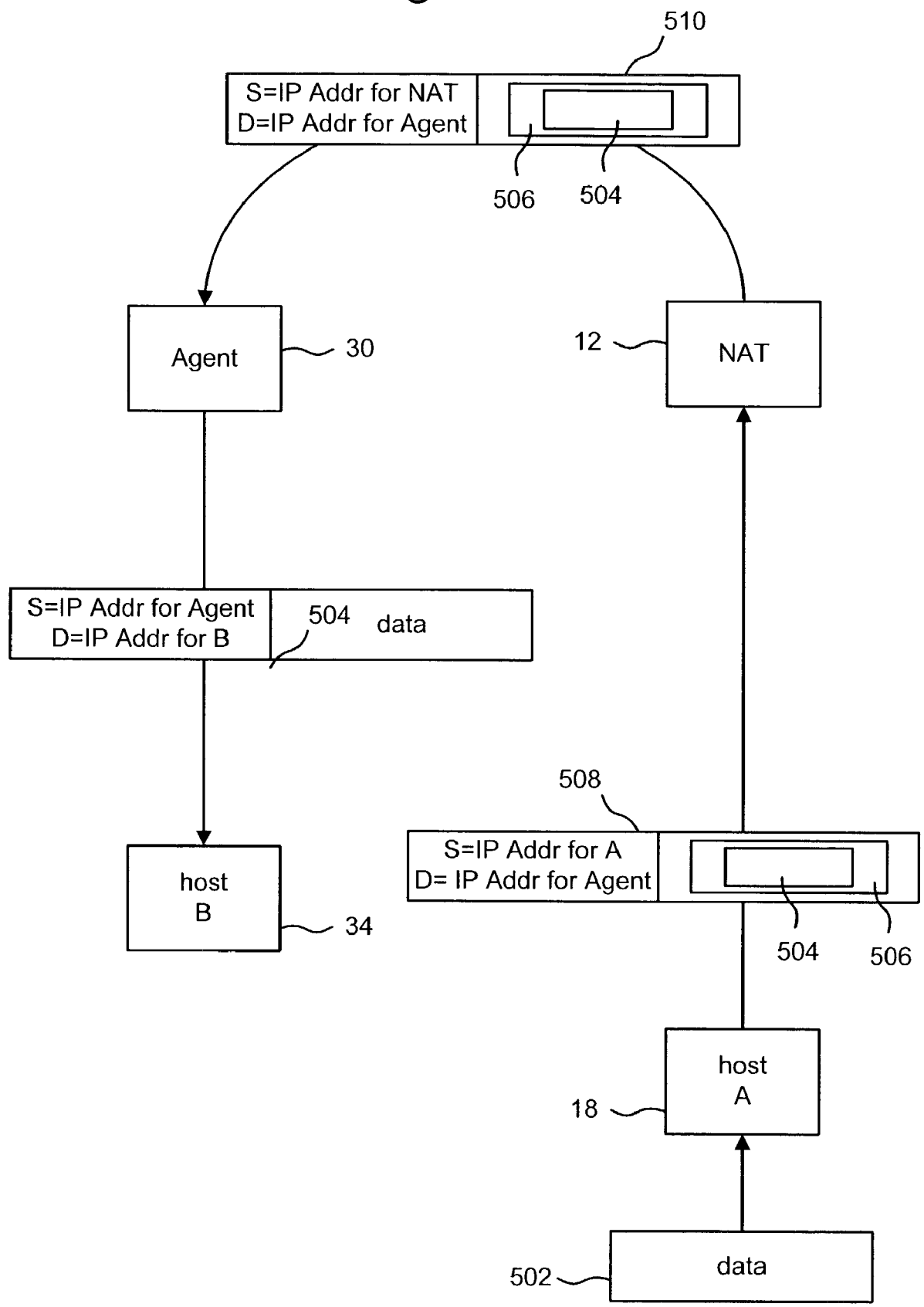
FIG. 10 is a block diagram that explains one embodiment of the process of sending data from an entity in a private network to another entity outside of the private network.

FIG. 9 is a flowchart describing a process performed when host A responds to a communication from host B. FIG. 10 further illustrates the process of FIG. 9. In step 450, host A creates an IP packet to be sent to host B. FIG. 10 shows data 502. In one implementation, data 502 is inserted into the IP packet created in step 450. In one embodiment, the IP packet created in step 450 may be an IPsec packet. In another embodiment, data 502 is an IPsec packet and this IPsec packet is encapsulated into an IP packet in step 450. In step 452, the IP packet created in step 450 is encapsulated within a UDP segment. That UDP segment is inserted into one more IP packets which is sent to NAT device 12 in step 454. FIG. 10 shows the IP packet 504 created in step 450. IP packet 504 is encapsulated within UDP segment 506. All of part of UDP segment 506 is within IP packet 508. IP packet 508 is sent from host A to NAT device 12 in step 454. The source address for IP packet 508 is the private IP address for host A. The destination address for IP packet 508 is the IP address for Agent 30.

In step 456 of FIG. 9, NAT device 12 changes the source address for the IP packet received and changes the source port for the UDP segment. The edited IP packet 510 has a source address corresponding to the IP address for NAT device 12. The destination address for IP packet 510 is the IP address for Agent 30. Edited IP packet 510 contains all or part of edited UDP segment 506. IP packet 510 and UDP segment 506 are sent to Agent 30 in step 458 of FIG. 9. IP packet 504 and UDP segment 506 are, thus, sent to Agent 30 via the persistent connection between host A and Agent 30. In step 460 of FIG. 9, Agent 30 accesses the look up table based on the data in UDP segment 506. If there is no entry in the lookup table that correspond to the data in UDP segment 506 (step 463), then an error message is sent back to host A in step 464. If there is entry in the table that corresponds to the data in UDP segment 506, then Agent 30 removes IP packet 504 from UDP segment 506 in step 466. Agent 30 sends IP packet 504 to host B in step 468. When host B receives IP packet 504 it accesses the data portion of the IP packet. In one embodiment, the data portion of IP packet 504 includes an IPsec packet which is accessed by host B.

Step 316 of FIG. 6 includes host A communicating with host B. This step includes host A sending communications to host B, and host B sending communications to host A. Host A sends communications to host B using the process of FIG. 9, or a process similar to that a FIG. 9. Host B send communications to host A using steps 308–314 of FIG. 6, or a process similar to those steps.

Although the above discussion contemplates that host A responds to host B by sending packets through Agent 30 and host B continues to send packets through Agent 30, other embodiments include subsequent communication that does not go through Agent 30. For example, once the first communication from host B arrives at host A via the Agent, host A can send its response directly to host B (without going through the Agent) by creating an IP packet with the IP address of host B as the destination address. Subsequently, host B can send IP packets to host A without going through the Agent by creating IP packets with the IP address of NAT device 12 as the destination address. NAT device 12 will forward the packets, with address translation according to standard NAT, to host A.

Figure 11:
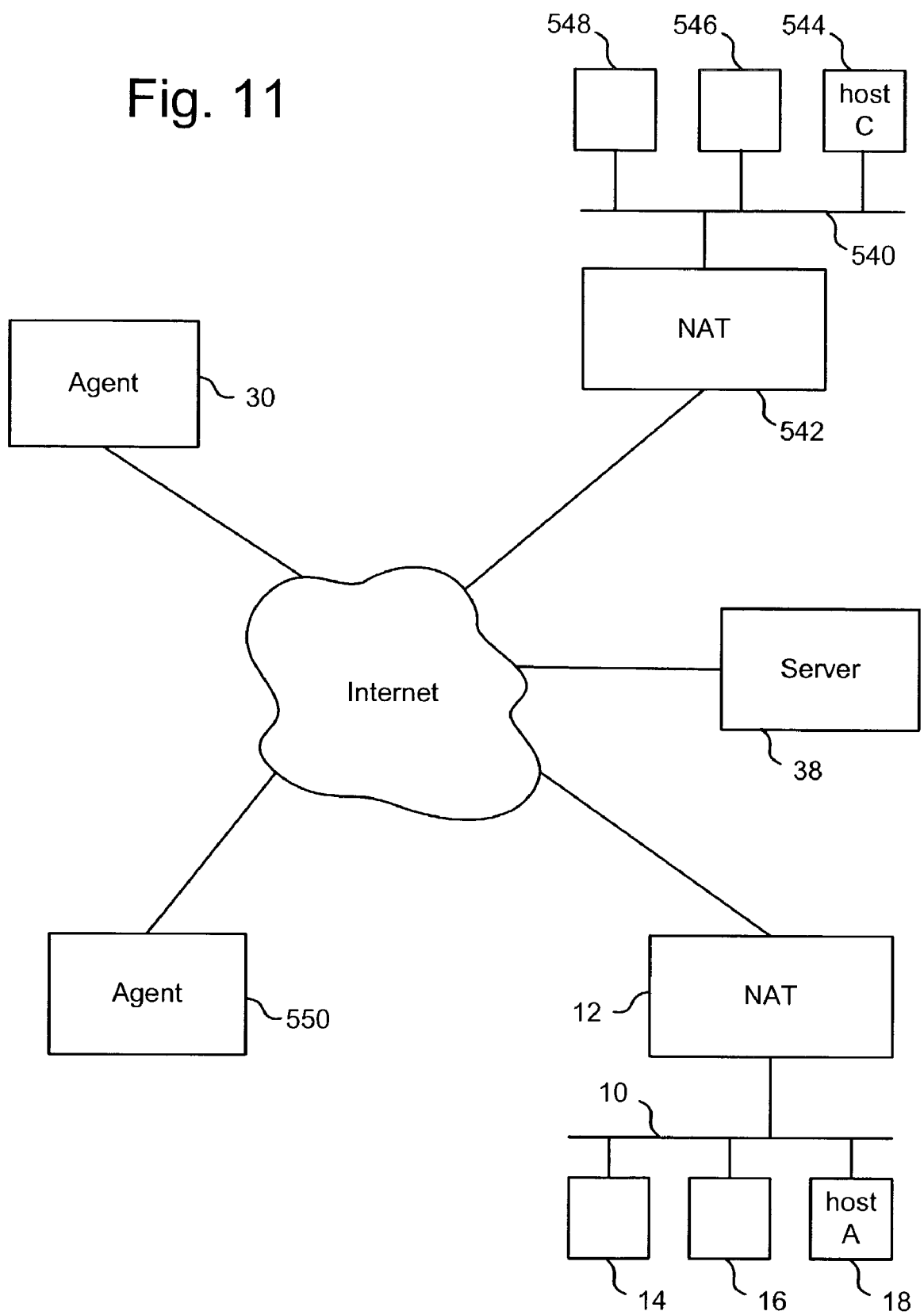
FIG. 11 depicts a block diagram describing another embodiment of the present invention.

FIG. 11 depicts another embodiment of the present invention. One difference between the embodiments of FIG. 11 and FIG. 1 is that the entity initiating communication with host A is behind a NAT device. For example, FIG. 11 shows private network 540. Connected to private network 540 are NAT device 542, entity 544, entity 546 and entity 548. Entity 544 is labeled as host C. Host C is an entity that is provided with a private address, but not a public IP address. Communications initiated by host C are provided with a public IP address by NAT device 542 in accordance with standard NAT. FIG. 11 depicts NAT device 542 at the edge of private network 540; however, NAT device 542 need not be at the edge of the network.

Figure 12:
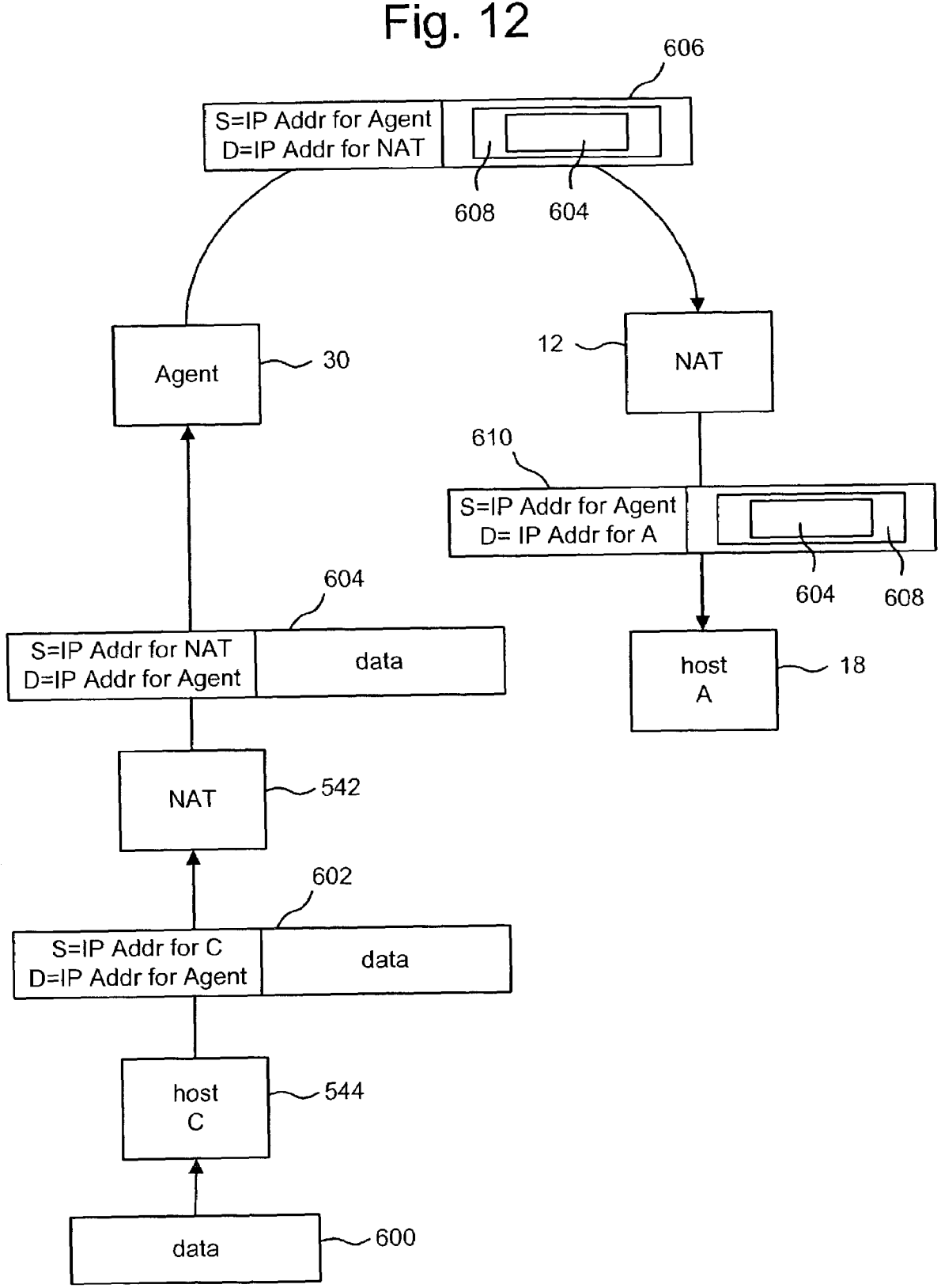
FIG. 12 is a block diagram that explains another embodiment of the process of sending data to an entity in a private network.

In the embodiment of FIG. 11, host C initiates communication with host A according to the present invention. That is, host C will perform the steps of FIG. 6 that were described above with respect host B. NAT device 542 will edit communications to and from host C so that host A can use a public IP address associated with NAT device 542. This processes is illustrated in FIG. 12, which shows host C sending a communication to host A. Host C creates IP packet 602 based on data 600. IP packet 602 has a source address corresponding to the private IP address for host C. The destination address for IP packet 602 corresponds to the IP address for Agent 30. IP packet 602 is sent to NAT device 542 and edited so that the edited IP packet 604 includes a source address corresponding to the IP address for NAT device 542. Agent 30 acts as described in FIG. 8, encapsulating IP packet 604 in UDP segment 608 and adding UDP segment 608 to IP packet 606. Agent 30 sends IP packet 606 to NAT device 12. IP packet 606 has a source address corresponding to the IP address for Agent 30. The destination address for IP packet 606 corresponds to the IP address for NAT device 12. As described in FIG. 8, NAT device 12 changes IP packet 606 (to create IP packet 610) so that the destination address becomes the private IP address for host A. Host A removes IP packet 604 from UDP segment 608.

Figure 13:
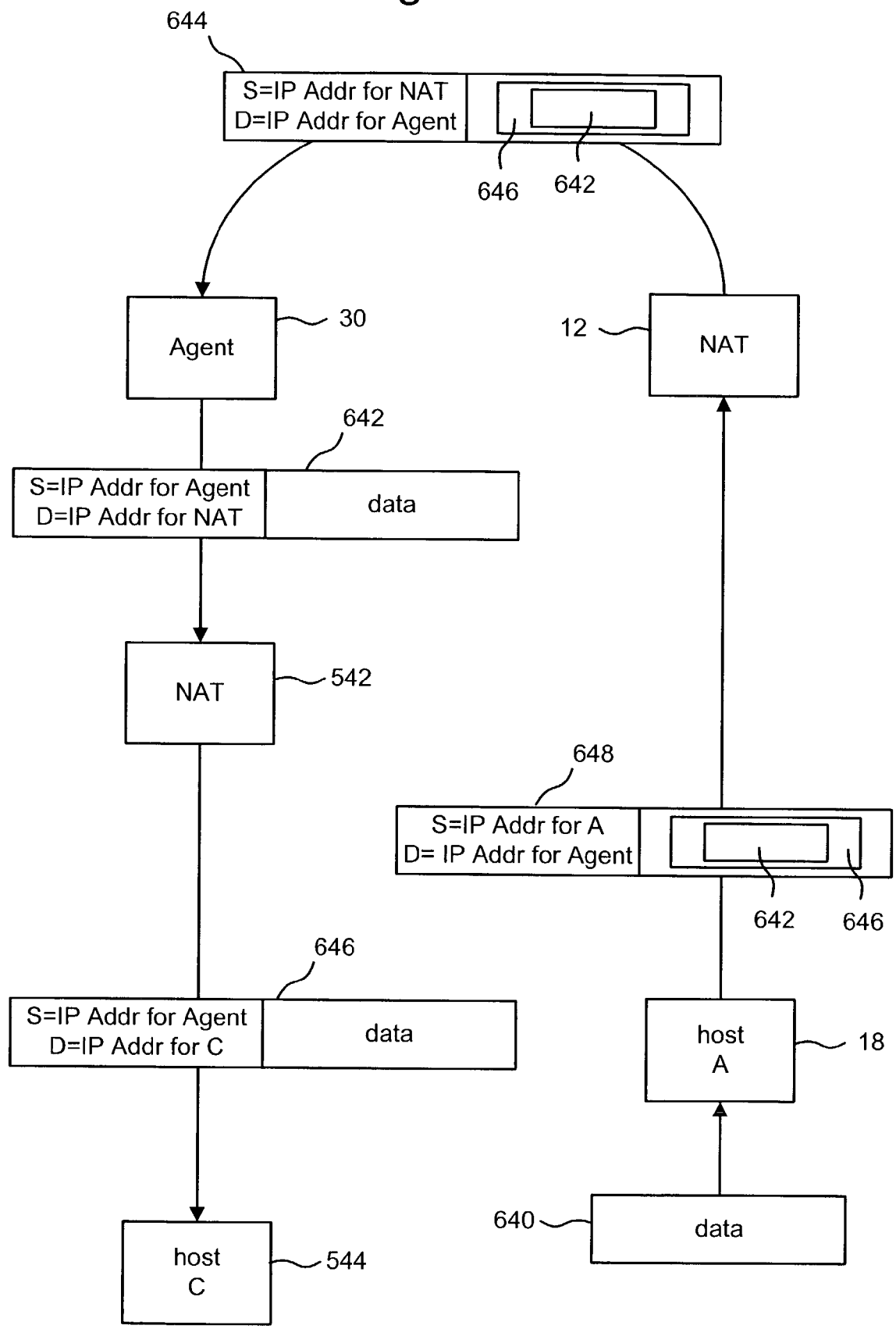
FIG. 13 is a block diagram that explains another embodiment of the process of sending data from an entity in a private network to another entity outside of the private network.

FIG. 13 illustrates a process for host A sending data back to host C. Using data 640 (which can be an IPsec packet), host A creates IP packet 642. The source address for IP packet 642 is the IP address associated with Agent 30. The destination IP address for IP packet 642 is the IP address for NAT 542. IP packet 642 is encapsulated within UDP segment 646. All or part of UDP segment 646 is within the data portion of IP packet 648. The source address for IP packet 648 is the private IP address for host A. The destination address for IP packet 648 is the IP address for Agent 30. IP packet 648 is sent to NAT device 12 which edits the IP packet to create IP packet 644. IP packet 644 has a source address identifying NAT device 12. The destination address for IP packet 644 is the IP address for Agent 30. IP packet 644 contains all or part of UDP segment 646. Agent 30 accesses the look up table as described in FIG. 9, removes IP packet 642 from UDP segment 646, and sends IP packet 642 to NAT device 542. NAT device 542 edits IP packet 642 to create IP packet 646. The source address for IP packet 646 corresponds to the IP address for Agent 30. The destination address for IP packet 646 is the private address for host C.

Although the above discussion contemplates that host A responds to host C by sending packets through Agent 30 and host C continues to send packets through Agent 30, other embodiments include subsequent communication that does not go through Agent 30. For example, once the first communication from host C arrives at host A via the Agent, host A can send its response directly to host C (without going through the Agent) by creating an IP packet with the IP address of NAT 542 as the destination address. NAT device 542 will forward the packets, with address translation according to standard NAT, to host C. Subsequently, host C can send IP packets to host A without going through the Agent by creating IP packets with the IP address of NAT device 12 as the destination address. NAT device 12 will forward the packets, with address translation according to standard NAT, to host A.

FIG. 11 also illustrates another embodiment of the present invention. This other embodiments include a second Agent 550. Agent 30 participates in a persistent connection between Agent 30 and host A. Agent 550 participates in a persistent connection between second entity 550 and host C. When host A initiates communication with host C, the data is first transmitted via the first persistent connection to second entity 30. From Agent 30, the data is sent to Agent 550. From Agent 550, the data is sent via the second persistent connection to host C. In another embodiment, a persistent connection can be set up between Agent 30 and Agent 550 so that communications between host A and host C are transmitted via the three persistent connections. In another embodiment, there can be multiple second entities. An entity in a private network registers with any of the second entities. In one alternative, the second entities can set up dedicated connections (made up of sets of one or more persistent connections, or other types of connections) between the different entities communicating. In another embodiment, the function performed by server 38 and the function performed by one or more second entities can be combined to be performed by a single device.

In many of the embodiments described above, Agent 30 is a stateful second entity. A stateful second entity maintains information regarding the private host (e.g. host A) and the routing information necessary to send communications to the private host. In other embodiments, the second entity can be a stateless second entity. In the case of the stateless second entity, the routing information is provided to the end hosts. The end hosts include the information in the packets. The stateless second entity will interpret the information included in the packets and make use of it when forwarding the packets.

FIG. 14 is a flow chart describing a process for making a host available for communication in an embodiment that uses a stateless second entity. Looking at FIG. 1, assume that Agent 30 does not store state information about host A and the persistent connection. Thus, the table created by Agent 30, described above, will not be created. For purposes of the explanation below, assume that the communication between host A and host B is being established so that an application on host B can communicate with an application on host A. Also assume that the applications form virtual IP packets (VIP) to send to each other. A VIP is a packet created by an application to be sent to another application. The VIP is only used at the application layer, and is not used at the network or transport layer. The VIP will, in many cases, be encapsulated in a UDP or TCP segment. The VIP may have a virtual address, which is an address used by an application to refer to different application or different instance of the same application running on the same or a different machine.

In step 700 of FIG. 14, host A contacts server 38. In one embodiment, server 38 recognizes that host A is behind a NAT and, therefore, an entity outside of host A's private network cannot initiate communication with host A. After making such a recognition, server 38 directs host A to Agent 30 in step 702. For example, server 30 will provide host A with the IP address for Agent 30. In some embodiments, steps 700 and 702 can be omitted. In step 704, host A contacts second entity 30 and establishes a persistent connection with Agent 30. In some embodiments, the persistent connection is a UDP connection that is referred to as a UDP tunnel. Step 704 includes host A sending a message to second entity 30, via NAT 12, requesting the establishment of a UDP connection. In one embodiment, the UDP segment created and transmitted by host A will have both the source and destination port numbers set to a well known port G. In step 706, Agent 30 sends a message to host A using the persistent connection to inform host A of the IP address that NAT 12 assigned to host A and the port number that NAT 12 is using for the persistent connection between Agent 30 and host A. Agent 30 knows this information from the packets and segments that it received from host A. In step 708, host A registers with server 38, informing server 38 of the IP address for NAT 12, the port number NAT 12 assigned for the persistent connection between host A and Agent 30, and the domain name (or other identifier) for host A. Alternatively, the agent registers the information with server 38. In step 710, host A maintains the persistent connection with Agent 30 by continuing to send UDP segments to Agent 30 (in some embodiments, referred to as Keep Alive Messages).

FIG. 15 is a flow chart describing a process for sending a communication to an entity in a private network in the embodiment where second entity 30 is a stateless switch. In order to initiate communication with host A, host B attempts to resolve the domain name (or other identifier) for host A with server 38 in step 750. Sever 38 responds to host B in step 752 by providing the IP address for NAT 12, the port number on NAT 12 that NAT 12 uses for the persistent connection between host A and Agent 30 and the IP address for Agent 30. In step 754, host B encapsulates the VIP packet into one or more UDP segments having the source and destination port numbers set to the well known port G. The UDP segment is placed in one or more IP packets to be sent to Agent 30. The IP packets have the IP address for host B as the source address and the IP address for Agent 30 as the destination address. If host B is behind a NAT device, referred to as NAT-B, then the source address field will be translated by NAT-B to its own public IP address and the UDP,source port number G is replaced by a port number selected by NAT-B (e.g. Port-B). In addition, host B will add a shim to the IP packet(s). The shim will include information that Agent 30 needs to forward the packet(s) to host A. A shim is an additional layer of information between the layers of the communication protocol; for example, a shim can be layer of data between the TCP data and the IP data. In one embodiment of the present invention, the shim created by host B stores the IP address of NAT 12 and the port on NAT 12 (e.g. port A) that is used for the persistent connection between host A and Agent 30. In step 756, the packet(s) with the shim, UDP segment and VIP are sent to Agent 30.

In step 760, Agent 30 receives packet and accesses the shim to determine where to forward the packet. Based on the information in the shim, Agent 30 changes the destination IP address of the packet(s) to the IP address for NAT 12 (found in the shim) in step 762. The source address is changed to the IP address for Agent 30. Based on the information in the shim, Agent 30 changes the destination port number in the segment to the port number on NAT 12 (port A—found in the shim) that is used for the persistent connection between host A and Agent 30 in step 764. In step 766, Agent 30 creates a new shim and replaces the contents of the original shim with the contents of the new shim. The new shim will include the IP address for host B (or the NAT for host B) and the source port number on host B (or the source port on the NAT for host B). The amended packet(s) is sent to NAT 12 in step 768 via the persistent connection. The amended packet(s) is translated by NAT 12 in step 770, including changing the destination IP address to the private address for host A and changing the port number. The translated packet(s), is sent to host A in step 772. Host A receives the packet(s) and stores the shim in step 774. The information from the shim is stored because it will be needed to reply to host B. In step 776, host A accesses the VIP from host B.

When host A replies to host B, it can do so directly without going through Agent 30. From the information in the shim, host A knows the IP address for host B and the port number for host B to send a UDP segment in one or more IP packets. Alternatively, host A can reply by sending the packet(s) to Agent 30 via the persistent connection, and have Agent 30 edit the packet(s) in a reverse manner from that described above. Agent 30 will then forward the packet(s) to host B.

To further the understanding of the embodiments using the stateless second entity, below is an example of how a packet changes during the steps described above. The description below uses the following notation for a packet:

[DA, AS](DP, SP)<A, P>{VIP}

[DA, AS] represents the destination and source IP addresses in the IP packet header, (DP, SP) represents the destination and source port numbers in the UDP segment header, <A, P> represents an IP address and a port number stored in the shim, {VIP} represents the VIP packet, and {Open tunnel}/

{Tunnel open}/{Keep Alive} represents codes or messages within a UDP segment or elsewhere.

The first case contemplates that both host A and host B use a well known port G, and that host B is behind a NAT device, designated as NAT-B. In one embodiment, the IP addresses for host A and host B are private addresses, while the IP addresses for Agent 30 and the NAT devices are public addresses.

Host A Creating a Tunnel with Agent 30:

Packet sent from host A to NAT 12:
  [Agent 30, host A](Port-G, Port-G)<null, null>{Open tunnel}

Packet sent from NAT 12 to Agent 30:
  [Agent 30, NAT 12](Port-G, Port-A)<null, null>{Open tunnel}

Packet from Agent 30 to NAT 12:
  [NAT 12, Agent 30](Port-A, Port-G)<NAT 12, Port-A>{Tunnel open}

Packet from NAT 12 to host A:
  [host A, Agent 30](Port-G, Port-G)<NAT 12, Port-A>{Tunnel open}

Keeping Tunnel Alive:

Packet sent from host A to NAT 12:
  [Agent 30, host A](Port-G, Port-G)<null, null>{Keep Alive}

Packet sent from NAT 12 to Agent 30:
  [Agent 30, NAT 12](Port-G, Port-A)<null, null>{Keep Alive}

Communication from Host B to Host A:

Packet sent from host B to NAT-B:
  [Agent 30, host B](Port-G, Port-G)<NAT 12, Port-A>{VIP}

Packet sent from NAT-B to Agent 30:
  [Agent 30, NAT-B](Port-G, Port-B)<NAT 12, Port-A>{VIP}

Packet from Agent 30 to NAT 12:
  [NAT 12, Agent 30](Port-A, Port-G)<NAT-B, Port-B>{VIP}

Packet from NAT 12 to host A:
  [host A, Agent 30](Port-G, Port-G)<NAT-B, Port-B>{VIP}

Communication from Host A to Host B:

Packet sent from host A to NAT 12:
  [Agent 30, host A](Port-G, Port-G)<NAT-B, Port-B>{VIP}

Packet sent from NAT 12 to Agent 30:
  [Agent 30, NAT 12](Port-G, Port-A)<NAT-B, Port-B>{VIP}

Packet from Agent 30 to NAT-B:
  [NAT-B, Agent 30](Port-B, Port-G)<NAT 12, Port-A>{VIP}

Packet from NAT-B to host B:
  [host B, Agent 30](Port-G, Port-G)<NAT 12, Port-A>{VIP}

The second case, below, contemplates that host A uses port A, host B uses port B, Agent 30 uses port G in both directions, host B is behind a NAT device, NAT 12 uses Port A' for the persistent connection, and NAT-B uses Port.-B'.

Host A Creating a Tunnel with Agent 30:

Packet sent from host A to NAT 12:
  [Agent 30, host A](Port-G, Port-A)<null, null>{Open tunnel}

Packet sent from NAT 12 to Agent 30:
  [Agent 30, NAT 12](Port-G, Port-A')<null, null>{Open tunnel}

Packet from Agent 30 to NAT 12:
  [NAT 12, Agent 30](Port-A', Port-G)<NAT 12, Port-A'>{Tunnel open}

Packet from NAT 12 to host A:
  [host A, Agent 30](Port-A, Port-G)<NAT 12, Port-A'>{Tunnel open}

Keeping Tunnel Alive:

Packet sent from host A to NAT 12:
  [Agent 30, host A](Port-G, Port-A)<null, null>{Keep Alive}

Packet sent from NAT 12 to Agent 30:
  [Agent 30, NAT 12](Port-G, Port-A')<null, null>{Keep Alive}

Communication from Host B to Host A:

Packet sent from host B to NAT-B:
  [Agent 30, host B](Port-G, Port-B)<NAT 12, Port-A'>{VIP}

Packet sent from NAT-B to Agent 30:
  [Agent 30, NAT-B](Port-G, Port-B')<NAT 12, Port-A'>{VIP}

Packet from Agent 30 to NAT 12:
  [NAT 12, Agent 30](Port-A', Port-G)<NAT-B, Port-B'>{VIP}

Packet from NAT 12 to host A:
  [host A, Agent 30](Port-A, Port-G)<NAT-B, Port-B'>{VIP}

Communication from Host A to Host B:

Packet sent from host A to NAT 12:
  [Agent 30, host A](Port-G, Port-A)<NAT-B, Port-B'>{VIP}

Packet sent from NAT 12 to Agent 30:
  [Agent 30, NAT 12](Port-G, Port-A')<NAT-B, Port-B'>{VIP}

Packet from Agent 30 to NAT-B:
  [NAT-B, Agent 30](Port-B', Port-G)<NAT 12, Port-A'>{VIP}

Packet from NAT-B to host B:
  [host B, Agent 30](Port-B, Port-G)<NAT 12, Port-A'>{VIP}

As discussed above, it is possible for the persistent connection to be a TCP connection. The connection is uniquely identified by the IP address of the NAT and the port number that the NAT has selected for that connection. For a stateful second entity, this information is to be associated in the second entity with the private host A; that is, with any identification we use for host A; e.g., domain name. All traffic destined to host A will be forwarded by the second entity on that tunnel. In one embodiment of a TCP persistent connection, the connection state information is maintained at each end of the connection. Data packets belonging to different connections established with host A (including TCP connections) get multiplexed on the same tunnel by considering each such packet as a separate TCP segment on the tunnel. Furthermore, its operation should be such that it does not raise any problem at the firewall. For example, sequence numbers should be properly advanced, and possibly acknowledgments should be appropriately generated. On the other hand, it is not necessary to guarantee reliability (and thus undertake retransmissions), nor exercise congestion control, as these functions would be provided at the individual connections level.

The destination port number to be used by host A in order to establish the tunnel may be restricted by the firewall. For example, it is possible that the firewall allows only port 80 (HTTP) to be the destination port of any connection established by a host within a private domain to an entity outside of the private. In that case, it is not possible to assign a different port number at the second entity for the different private hosts that establish tunnels with it.

The above embodiments all contemplate that messages to host A are, at least initially, sent to host A via the persistent connection. An alternative is a system that uses a persistent connection to initiate communication with host A, but does not send the messages via the persistent connection. Such a system can use the second entity for the persistent connection or can eliminate the second entity by using the server for the persistent connection. For example, when host B seeks to resolve the domain name for host A, it will received the IP address for NAT 12 (see FIG. 1) and the port on NAT 12 that is used for the persistent connection with the server or the second entity. Host B can then send a message to host A using the IP address for NAT 12 (see FIG. 1) and the port on NAT 12 that is used for the persistent connection with Agent 30. NAT 12 will receive the message from host B, translate it and forward it to host A. If host B is behind a NAT device (e.g. host C is behind NAT 542), then the replies form host A to host B are addressed to the IP address and port of the NAT device for host B.

If NAT 12 checks the source IP address in incoming packets, rejecting those in which the source IP address is different than the destination IP address for which the connection was established in the first place, a paging solution can be used. In the paging solution, host A establishes a persistent connection with the server (or second entity), which gets used by the latter to communicate signaling information to host A. Host B, interested in establishing a connection with host A, sends a page for host A to the server requesting host A to establish a connection with host B. The server forwards the page to host A on the UDP connection maintained by Host A with the server. Host A establishes a connection with Host B as requested.

Now consider a paging solution where both hosts (e.g. host A and host C) are private entities behind NAT devices, other types of stateful switches, or other devices that provide for communication with private entities. In this case, the persistent connection established by host A with the second entity or server is used for signaling purposes between the server and host A. When host C decides to communicate with host A, then host C sends a first UDP packet addressed to NAT 12 (published in the server). This causes NAT 542 to assign a port for a connection to NAT 12. In order for the port number selected by NAT 542 to become known to host A, this first UDP packet is source routed through the server. The server intercepts the packet and extracts the port number. The first UDP packet should also contain information that indicates that host C is trying to reach host A. The server then communicates the IP address of NAT 542 and the port number chosen by NAT 542 to Host A over the persistent connection that host A is maintaining with the server. This process constitutes a page to host A prompting it to respond to host C using the IP address of NAT 542 and the port number in question. This step completes the establishment of a connection between host A and host C. NAT 12 selects a port number for the traffic from host A to host C (NAT 542). From this point on, data can flow between hosts A and C in both directions through NAT 12 and NAT 542 and the ports selected therein. Note that this solution is based on the fact that NAT 542 maintains the allocation of the port number to Host C's connection to NAT 12 for a certain period of time awaiting a response from the destination. It thus requires that host A responds within that timeout period. It is also based on the assumption that each NAT possesses a single IP address.

More information about systems that use a persistent connection to initiate communication with host A, but do not send the messages via the persistent connection can be found in co-pending application COMMUNICATING WITH AN ENTITY INSIDE A PRIVATE NETWORK USING AN EXISTING CONNECTION TO INITIATE COMMUNICATION, Hasan S. Alkhatib, Fouad A. Tobagi, Farid F. Elwailly and Bruce C. Wootton, filed on the same day as the present application with attorney docket number TTCC-01016US0, incorporated herein by reference.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for communicating among network entities, comprising:

establishing a persistent connection between a first entity in a private network and a second entity outside said private network to enable access to the first entity by entities outside of the private network, said establishing a persistent connection includes associating a public address with the first entity and communicating the public address associated with the first entity to the second entity, the second entity having an associated public address which is different than the public address associated with the first entity;

providing the public address of the second entity to a third entity outside said private network;

initiating communication with said first entity, said communication is initiated by said third entity from outside said private network providing an identification associated with said persistent connection and data for the first entity to said second entity, said identification and said data being provided to said second entity using the public address of the second entity as a destination address, said second entity identifying said public address associated with said first entity based on the identification and forwarding the data to said first entity via said persistent connection using said public address associated with said first entity; and exchanging subsequent communication between said first entity and said third entity through a device associated with said private network using a private address of the first entity.

2. A method according to claim 1, wherein:
all subseguent communication between said first entity and said third entity is transmitted via said persistent connection.

3. A method according to claim 1, wherein:
said device is a stateful edge device for said private network; and
said persistent connection goes through said stateful edge device for said private network.

4. A method according to claim 1, wherein said step of exchanging subsequent communication includes:
inserting an IP packet into a UDP segment at said first entity;
sending said UDP segment from said first entity to said second entity via said device and said persistent connection;
removing said IP packet from said UDP segment at said second entity; and
sending said IP packet from said second entity to said third entity.

5. A method according to claim 1, wherein said step of exchanqinq subsequent communication includes the steps of:
inserting an IP packet into a UDP segment at said first entity;
sending said UDP segment from said first entity to said device via said persistent connection;
sending said UDP segment from said device to said second entity via said persistent connection using an address of said device as a source address;
removing said IP packet from said UDP segment at said second entity; and
sending said IP packet from said second entity to said third entity.

6. A method according to claim 1, further comprising the steps of:
connecting said first entity to said private network;
receiving a private address to be used by said first entity in said private network; and
registering said first entity with said second entity.

7. A method according to claim 1, further comprising the steps of:
maintaining said persistent connection; and
registering said first entity with said second entity prior to said step of maintaining.

8. A method according to claim 7, wherein said step of registering includes the steps of:
creating a UDP segment;
sending said UDP segment from said first entity to said second entity; and
storing, at said second entity, identification information for said first entity.

9. A method according to claim 8, wherein:
said identification information includes a domain name, an address, and a port.

10. A method according to claim 7, wherein said step of registering includes the steps of:
creating a UDP segment, said UDP segment includes a code requesting establishment of a connection;
sending said UDP segment from said first entity to said device;
sending said UDP segment from said device to said second entity using an IP address for said device as a source address; and
storing data at said second entity, said data includes an IP address for said device, a port at said device associated with said UDP packet and a domain name for said first entity.

11. A method according to claim 1, wherein:
said device is a NAT device; and
said persistent connection goes through said NAT device.

12. A method according to claim 7, wherein:
said step of maintaining includes sending keep alive packets from said first entity to said second entity prior to expiration of a predetermined time interval.

13. A method according to claim 1, further comprising the steps of:
sending a request by said third entity to resolve a domain name for said first entity; and
receiving a response to said request at said third entity, said response includes an address for said second entity.

14. A method according to claim 1, further comprising the steps of:
sending a request by said third entity to resolve a domain name for said first entity; and
receiving a response to said request at said third entity, said response includes an address for said second entity and an identifier for said first entity.

15. A method according to claim 1, wherein said step of providing data for said first entity to said second entity includes the steps of:
creating a packet at said third entity;
adding a domain name to said packet; and
sending said packet from said third entity to said second entity.

16. A method according to claim 1, wherein said step of forwarding includes the steps of:
associating said data with said first entity;
inserting said data into a UDP segment; and
sending said UDP segment to said first entity via said persistent connection.

17. A method according to claim 16, wherein said step of forwarding includes the step of:
determining whether a domain name is included with said data, said step of inserting and sending are only performed if said domain name is included with said data.

18. A method according to claim 16, wherein said step of sending said UDP packet to said first entity includes the steps of:
sending said UDP segment from said second entity to said device using a first address for said device; and
sending said UDP segment from said device to said first entity using a private address for said first entity.

19. A method according to claim 16, wherein:
said step of associating includes accessing a look up table on said second entity using an identifier of said first entity from said data; and
said step of inserting includes using data in said look up table to add port information to said UDP segment and to address a packet for said UDP segment.

20. A method according to claim 1, wherein:
said device is a first NAT device;
said third entity is in a different private network using a different NAT device;
said first entity communicates outside of said private network which said first entity is in using said first NAT device;

said third entity communicates outside said different private network using said different NAT device;
said persistent connection goes through said first NAT device.

21. A method according to claim 1, wherein:
said device is a NAT device for said private network; and
said persistent connection goes through said NAT device.

22. A method according to claim 1, wherein:
said device is a stateless edcie device for said private network; and
said persistent connection goes through said stateless edge device.

23. A method according to claim 22, wherein:
said third entity initiates communication by providing a shim to said second entity which identifies a port number and an address for said device.

24. A method according to claim 1, further comprising the steps of:
storing an entry in a data structure identifying said persistent connection; and
receiving keep alive packets from said first entity prior to expiration of a predetermined time interval.

25. One or more processor readable storage devices having processor readable code embodied on said processor readable storage devices, said processor readable code for programming one or more processors to perform a method comprising:
establishing a persistent connection between a first entity in a private network and a second entity outside said private network to enable access to the first entity by entities outside of said private network, said establishing a persistent connection includes associating a public address with the first entity and communicating the public address associated with the first entity to the second entity, the second entity having an associated public address which is different than the public address associated with the first entity;
providing the public address of the second entity to a third entity outside said private network;
initiating communication with said first entity, said communication is initiated by said third entity from outside said private network providing an identification associated with said persistent connection and data for said first entity to said second entity, said identification and said data being provided to said second entity using the public address of the second entity as a destination address, said second entity identifying said public address associated with said first entity based on the identification and forwarding the data to said first entity via said persistent connection using said public address associated with said first entity; and
exchanging subsequent communication between said first entity and said third entity through a device associated with said private network using a private address of said first entity.

26. One or more processor readable storage devices according to claim 25, wherein said method further comprises the steps of:
inserting a packet into a UDP segment at said first entity;
sending said UDP segment from said first entity to said second entity via said persistent connection; and
sending said packet from said second entity to said third entity.

27. One or more processor readable storage devices according to claim 25 wherein said step of forwarding includes the steps of:
associating said data with said first entity;
inserting said data into a UDP segment; and
sending said UDP segment to said first entity via said persistent connection.

28. One or more processor readable storage devices according to claim 27, wherein said step of forwarding includes the step of:
determining whether a domain name is included with said data, said step of inserting and sending are only performed if said domain name is included with said data.

29. One or more processor readable storage devices according to claim 27, wherein said step of sending said UDP packet to said first entity includes the steps of:
sending said UDP segment from said second entity to said device using a first address for said device; and
sending said UDP segment from said device to said first entity using a private address for said first entity.

30. One or more processor readable storage devices according to claim 27, wherein:
said step of associating includes accessing a look up table on said second entity using an identifier of said first entity from said data; and
said step of inserting includes using data in said look up table to add port information to said UDP segment and to address a packet for said UDP segment.

31. One or more processor readable storage devices according to claim 25, wherein:
all subsequent communication between said first entity and said third entity is transmitted via said persistent connection.

32. One or more processor readable storage devices according to claim 25, wherein:
said device is a stateful edge device for said private network; and
said persistent connection goes through said stateful edge device for said private network.

33. One or more processor readable storage devices according to claim 25, wherein said step of exchanging subsequent communication includes:
inserting an IP packet into a UDP segment at said first entity;
sending said UDP segment from said first entity to said second entity via said device and said persistent connection;
removing said IP packet from said UDP segment at said second entity; and
sending said IP packet from said second entity to said third entity.

34. One or more processor readable storage devices according to claim 25, wherein said step of exchanging subsequent communication includes the steps of:
inserting an IP packet into a UDP segment at said first entity;
sending said UDP segment from said first entity to said device via said persistent connection;
sending said UDP segment from said device to said second entity via said persistent connection using an address of said device as a source address;
removing said IP packet from said UDP segment at said second entity; and
sending said IP packet from said second entity to said third entity.

35. One or more processor readable storage devices according to claim 25, wherein said method further comprises the steps of:
connecting said first entity to said private network;
receiving a private address to be used by said first entity in said private network; and registering said first entity with said second entity.

36. One or more processor readable storage devices according to claim 25, wherein said method further comprises the steps of:
   maintaining said persistent connection; and
   registering said first entity with said second entity prior to said step of maintaining.

37. One or more processor readable storage devices according to claim 36, wherein said step of registering includes the steps of:
   creating a UDP segment;
   sending said UDP segment from said first entity to said second entity; and
   storing, at said second entity, identification information for said first entity.

38. One or more processor readable storage devices according to claim 37, wherein:
   said identification information includes a domain name, an address, and a port.

39. One or more processor readable storage devices according to claim 36, wherein said step of registering includes the steps of:
   creating a UDP segment, said UDP segment includes a code requesting establishment of a connection;
   sending said UDP segment from said first entity to said device;
   sending said UDP segment from said device to said second entity using an IP address for said device as a source address; and
   storing data at said second entity, said data includes an IP address for said device, a port at said device associated with said UDP packet and a domain name for said first entity.

40. One or more processor readable storage devices according to claim 36, wherein:
   said step of maintaining includes sending keep alive packets from said first entity to said second entity prior to expiration of a predetermined time interval.

41. One or more processor readable storage devices according to claim 25, wherein:
   said device is a NAT device; and
   said persistent connection goes through said NAT device.

42. One or more processor readable storage devices according to claim 25, wherein said method further comprises the steps of:
   sending a request by said third entity to resolve a domain name for said first entity; and
   receiving a response to said request at said third entity, said response includes an address for said second entity.

43. One or more processor readable storage devices according to claim 25, wherein said method further comprises the steps of:
   sending a request by said third entity to resolve a domain name for said first entity; and
   receiving a response to said request at said third entity, said response includes an address for said second entity and an identifier for said first entity.

44. One or more processor readable storage devices according to claim 25, wherein said step of providing data for said first entity to said second entity includes the steps of:
   creating a packet at said third entity;
   adding a domain name to said packet; and
   sending said packet from said third entity to said second entity.

45. One or more processor readable storage devices according to claim 25, wherein:
   said device is a first NAT device;
   said third entity is in a different private network using a different NAT device;
   said first entity communicates outside of said private network which said first entity is in using said first NAT device;
   said third entity communicates outside said different private network using said different NAT device;
   said persistent connection goes through said first NAT device.

46. One or more processor readable storage devices according to claim 25, wherein:
   said device is a NAT device for said private network; and
   said persistent connection goes through said NAT device.

47. One or more processor readable storage devices according to claim 25, wherein:
   said device is a stateless edge device for said private network; and
   said persistent connection goes through said stateless edge device.

48. One or more processor readable storage devices according to claim 47, wherein:
   said third entity initiates communication by providing a shim to said second entity which identifies a port number and an address for said device.

49. One or more processor readable storage devices according to claim 25, wherein said method further comprises the steps of:
   storing an entry in a data structure identifying said persistent connection; and
   receiving keep alive packets from said first entity prior to expiration of a predetermined time interval.

50. An apparatus, comprising:
   a communication interface;
   one or more storage devices; and
   one or more processors in communication with said one or more storage devices and said communication interface, said one or more processors programmed to perform a method comprising;
   establishing a persistent connection between a first entity in a private network and a second entity outside said private network to enable access to the first entity by entities outside of the private network, said establishing a persistent connection includes associating a public address with the first entity and communicating the public address associated with the first entity to the second entity, the second entity having an associated public address which is different than the public address associated with the first entity;
   providing the public address of the second entity to a third entity outside said private network;
   initiating communication with said first entity, said communication is initiated by said third entity from outside said private network providing an identification associated with said persistent connection and data for the first entity to said second entity, said identification and said data being provided to said second entity using the public address of said second entity as a destination address, said second entity identifying said public address associated with said first entity based on the identification and forwarding the data to said first entity via said persistent connection using said public address associated with said first entity; and
   exchanging subsequent communication between said first entity and said third entity through a device associated with said private network using a private address of the first entity.

51. An apparatus according to claim 50, wherein:
all subsequent communication between said first entity and said third entity is transmitted via said persistent connection.

52. An apparatus according to claim 50, wherein:
said device is a stateful edge device for said private network; and
said persistent connection goes through said stateful edge device for said private network.

53. An apparatus according to claim 50, wherein said step of exchanging subsequent communication includes:
inserting an IP packet into a UDP segment at said first entity;
sending said UDP segment from said first entity to said second entity via said device and said persistent connection;
removing said IP packet from said UDP segment at said second entity; and
sending said IP packet from said second entity to said third entity.

54. An apparatus according to claim 50, wherein said step of exchanging subsequent communication includes the steps of:
inserting an IP packet into a UDP segment at said first entity;
sending said UDP segment from said first entity to said device via said persistent connection;
sending said UDP segment from said device to said second entity via said persistent connection using an address of said device as a source address;
removing said IP packet from said UDP segment at said second entity; and
sending said IP packet from said second entity to said third entity.

55. An apparatus according to claim 50, wherein said method further comprises the steps of:
connecting said first entity to said private network;
receiving a private address to be used by said first entity in said private network; and
registering said first entity with said second entity.

56. An apparatus according to claim 50, wherein said method further comprises the steps of:
maintaining said persistent connection; and
registering said first entity with said second entity prior to said step of maintaining.

57. An apparatus according to claim 56, wherein said step of registering includes the steps of:
creating a UDP segment;
sending said UDP segment from said first entity to said second entity; and
storing, at said second entity, identification information for said first entity.

58. An apparatus according to claim 57, wherein:
said identification information includes a domain name, an address, and a port.

59. An apparatus according to claim 56, wherein said step of registering includes the steps of:
creating a UDP segment, said UDP segment includes a code requesting establishment of a connection;
sending said UDP segment from said first entity to said device;
sending said UDP segment from said device to said second entity using an IP address for said device as a source address; and
storing data at said second entity, said data includes an IP address for said device, a port at said device associated with said UDP packet and a domain name for said first entity.

60. An apparatus according to claim 56, wherein:
said step of maintaining includes sending keep alive packets from said first entity to said second entity prior to expiration of a predetermined time interval.

61. An apparatus according to claim 50, wherein:
said device is a NAT device; and
said persistent connection goes through said NAT device.

62. An apparatus according to claim 50, wherein said method further comprises the steps of:
sending a request by said third entity to resolve a domain name for said first entity; and
receiving a response to said request at said third entity, said response includes an address for said second entity.

63. An apparatus according to claim 50, wherein said method further comprises the steps of:
sending a request by said third entity to resolve a domain name for said first entity; and
receiving a response to said request at said third entity, said response includes an address for said second entity and an identifier for said first entity.

64. An apparatus according to claim 50, wherein said step of providing data for said first entity to said second entity includes the steps of:
creating a packet at said third entity;
adding a domain name to said packet; and
sending said packet from said third entity to said second entity.

65. An apparatus according to claim 50, wherein said step of forwarding includes the steps of:
associating said data with said first entity;
inserting said data into a UDP segment; and
sending said UDP segment to said first entity via said persistent connection.

66. An apparatus according to claim 65, wherein said step of forwarding includes the step of:
determining whether a domain name is included with said data, said step of inserting and sending are only performed if said domain name is included with said data.

67. An apparatus according to claim 65, wherein said step of sending said UDP packet to said first entity includes the steps of:
sending said UDP segment from said second entity to said device using a first address for said device; and
sending said UDP segment from said device to said first entity using a private address for said first entity.

68. An apparatus according to claim 65, wherein:
said step of associating includes accessing a look up table on said second entity using an identifier of said first entity from said data; and
said step of inserting includes using data in said look up table to add port information to said UDP segment and to address a packet for said UDP segment.

69. An apparatus according to claim 50, wherein:
said device is a first NAT device;
said third entity is in a different private network using a different NAT device;
said first entity communicates outside of said private network which said first entity is in using said first NAT device;
said third entity communicates outside said different private network using said different NAT device;
said persistent connection goes through said first NAT device.

70. An apparatus according to claim 50, wherein:
said device is a NAT device for said private network; and
said persistent connection goes through said NAT device.

71. An apparatus according to claim 50, wherein:
said device is a stateless edge device for said private network; and
said persistent connection goes through said stateless edge device.

72. An apparatus according to claim 71, wherein:
said third entity initiates communication by providing a shim to said second entity which identifies a port number and an address for said device.

73. An apparatus according to claim 50, wherein said method further comprises the steps of:
storing an entry in a data structure identifying said persistent connection; and
receiving keep alive packets from said first entity prior to expiration of a predetermined time interval.

74. A method for communicating among network entities, comprising:
establishing a persistent connection between a first host in a private network and an agent outside said private network to enable at least a second host which is outside of the private network to initiate communication with the first host, a stateful device associated with the private network associating a public address with the first host and communicating the public address and a name of the first host to the agent, the agent having an associated public address which is different than the public address associated with the first host, the agent communicating its public address and the name of the first host to a name server;
receiving, at the name server, a request from the second host to resolve the name of the first host, the name server providing the public address of the agent to the second host in response to the request; and
receiving, at the agent, an initial communication from the second host which is intended for the first host and which use the public address of the agent, the initial communication including an identification associated with said persistent connection, the agent using the identification associated with said persistent connection to identify the public address associated with the first host and forward the initial communication to the stateful device via the persistent connection using the public address associated with the first host, the stateful device forwarding the initial communication to the first host using a private address of the first host.

* * * * *